(12) United States Patent
Fleischer et al.

(10) Patent No.: US 11,666,961 B2
(45) Date of Patent: Jun. 6, 2023

(54) CAM FOLLOWER ASSEMBLY FOR CAN BODYMAKER AND CAN BODYMAKER INCLUDING SAME

(71) Applicant: Stolle Machinery Company, LLC, Centennial, CO (US)

(72) Inventors: Karl S. Fleischer, Denver, CO (US); Ian Kenneth Scholey, Barnsley (GB); Leonardo Antonio Butolo Ribeiro, Brasilia/Brazil (BR); Sylvan Mario Praturlon, Pittsburgh, PA (US)

(73) Assignee: Stolle Machinery Company, LLC, Centennial, CO (US)

( * ) Notice: Subject to any disclaimer, the term of this patent is extended or adjusted under 35 U.S.C. 154(b) by 438 days.

(21) Appl. No.: 16/885,589

(22) Filed: May 28, 2020

(65) Prior Publication Data
US 2021/0370382 A1    Dec. 2, 2021

(51) Int. Cl.
*B21D 51/26*        (2006.01)
*B30B 1/26*         (2006.01)
*F16H 25/08*        (2006.01)
*F16H 53/06*        (2006.01)
*F16H 25/14*        (2006.01)

(52) U.S. Cl.
CPC .......... *B21D 51/2669* (2013.01); *B30B 1/261* (2013.01); *F16H 25/14* (2013.01); *F16H 53/06* (2013.01)

(58) Field of Classification Search
CPC .... B21D 22/28; B21D 51/26; B21D 51/2669; F16H 25/14; F16H 53/06; F16H 53/08; B30B 1/261
See application file for complete search history.

(56) References Cited

U.S. PATENT DOCUMENTS

| | | | |
|---|---|---|---|
| 3,299,845 A * | 1/1967 | Geiger | B21D 51/34 413/26 |
| 3,702,559 A | 11/1972 | Hasselbeck et al. | |
| 4,030,432 A | 6/1977 | Miller et al. | |
| 4,173,138 A | 11/1979 | Main et al. | |
| 4,462,738 A * | 7/1984 | Walters | B65G 59/067 414/797.9 |
| 4,519,232 A | 5/1985 | Traczyk et al. | |
| 4,774,839 A | 10/1988 | Caleffi et al. | |
| 5,076,087 A * | 12/1991 | Slater | B21D 51/2615 72/110 |
| 5,134,874 A | 8/1992 | Williams | |
| 7,882,721 B2 | 2/2011 | Gombas | |
| 8,789,403 B2 | 7/2014 | Egerton et al. | |
| 9,162,274 B2 | 10/2015 | An et al. | |
| 10,137,490 B2 | 11/2018 | Butcher et al. | |

(Continued)

OTHER PUBLICATIONS

U.S. Patent and Trademark Office, PCT Application No. PCT/US21/22537 International Search Report, dated Jun. 3, 2021, 20 pages.

*Primary Examiner* — Adam D Rogers
(74) *Attorney, Agent, or Firm* — Eckert Seamans Cherin & Mellott, LLC

(57) ABSTRACT

A cam follower assembly for a can bodymaker includes a slider structured to be coupled to the proximal end of a ram body of the can bodymaker; and a plurality of cam follower members rotatably coupled to the slider. The cam follower members are structured to be operatively coupled to a cam of a ram drive assembly.

13 Claims, 18 Drawing Sheets

(56) References Cited

U.S. PATENT DOCUMENTS

| | | |
|---|---|---|
| 10,343,208 B2 | 7/2019 | Fleischer et al. |
| 11,338,351 B2 * | 5/2022 | Fleischer ........... B21D 51/2692 |
| 2021/0370381 A1* | 12/2021 | Fleischer ........... B21D 51/2669 |
| 2021/0370383 A1* | 12/2021 | Fleischer ............... B21D 22/28 |
| 2021/0370385 A1* | 12/2021 | Fleischer ........... B21D 51/2692 |
| 2022/0241839 A1* | 8/2022 | Fleischer ............... B21D 51/26 |

* cited by examiner

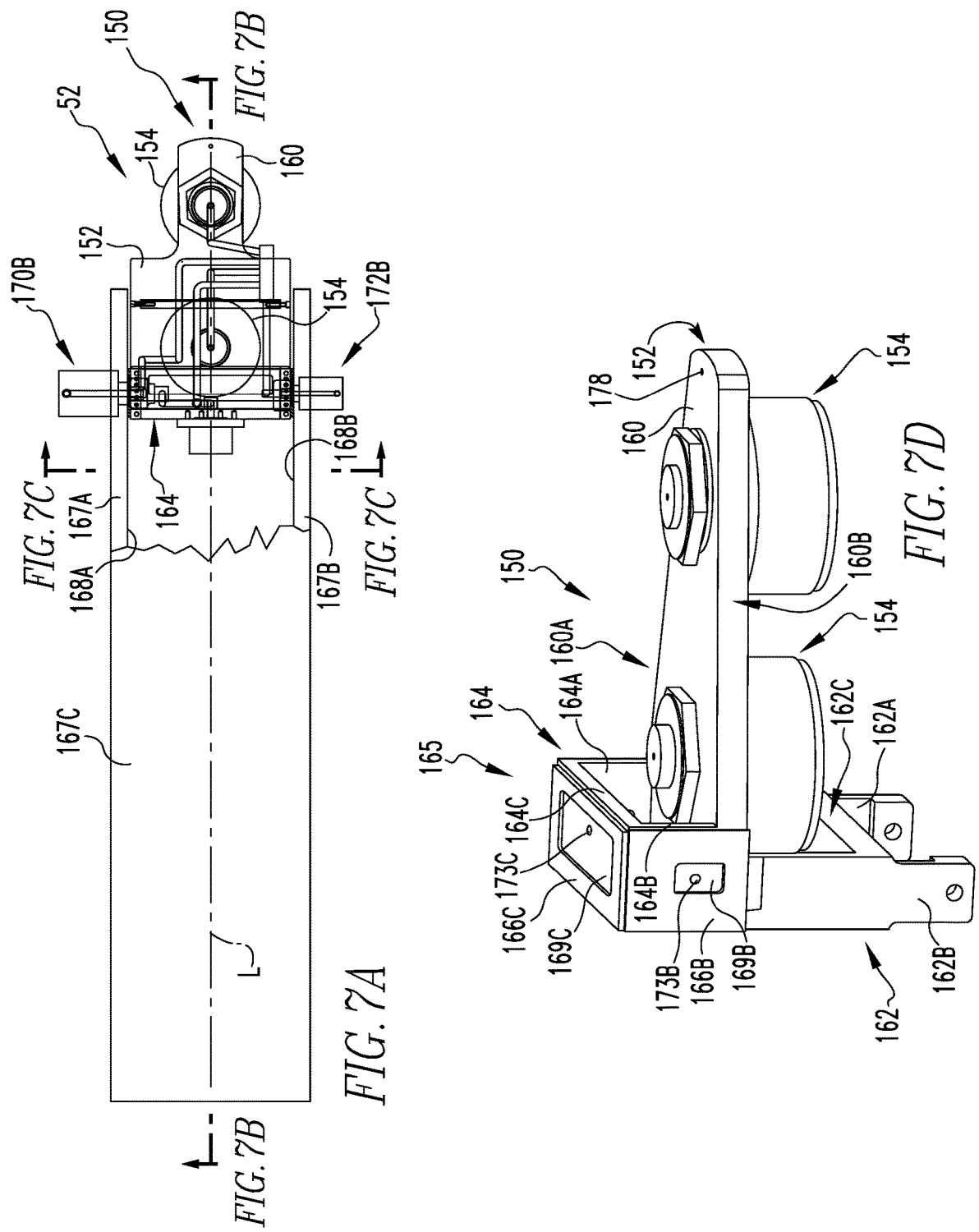

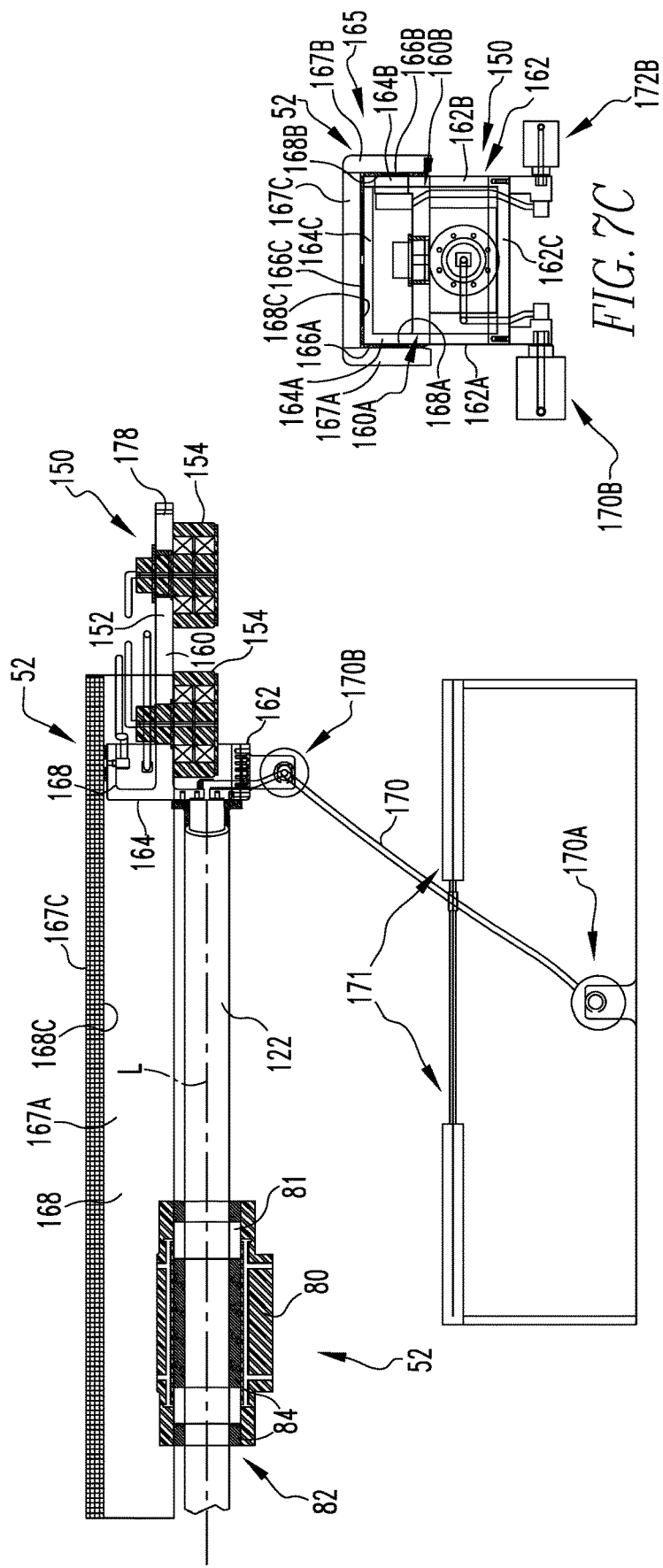

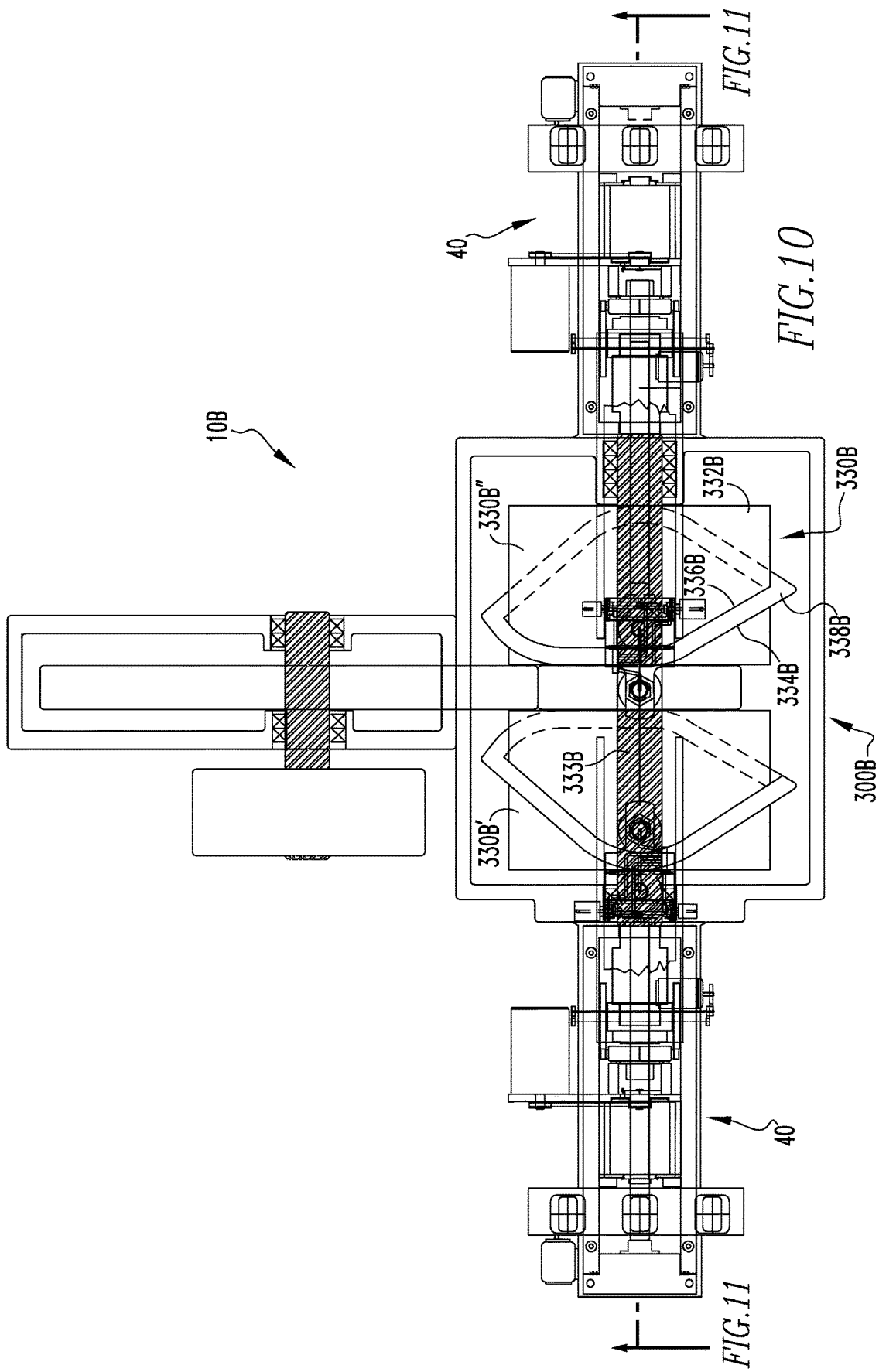

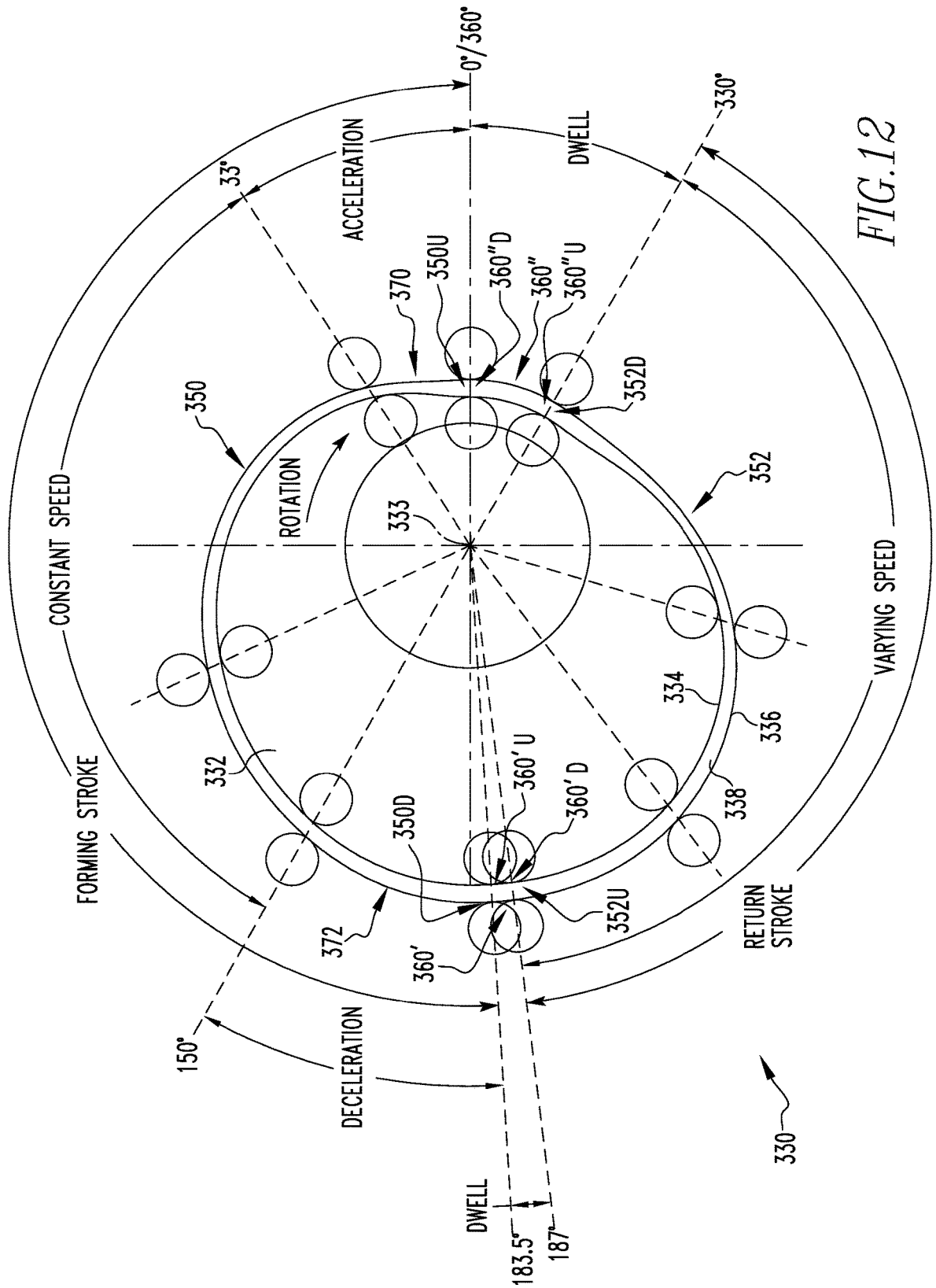

CAM FOLLOWER ASSEMBLY FOR CAN BODYMAKER AND CAN BODYMAKER INCLUDING SAME

BACKGROUND

Field

The disclosed and claimed concept relates to a can bodymaker and, more specifically, to a cam follower assembly for use in a can bodymaker driven by a cam.

Background Information

Generally, an aluminum can begins as a disk of aluminum, also known as a "blank," that is punched from a sheet or coil of aluminum. That is, the sheet is fed into a press where a "blank" disk is cut from the sheet by an outer slide/ram motion. An inner slide/ram then pushes the "blank" through a draw process to create a cup. The cup has a bottom and a depending sidewall. The cup is fed into a bodymaker which further performs a redraw and ironing operation that forms the cup into a can body. That is, the bodymaker includes a punch disposed on an elongated, reciprocating ram assembly. The cup is positioned in front of the punch which then moves the cup through a die pack wherein the radius of the cup is reduced and the depending sidewall is elongated and thinned.

More specifically, the cup is disposed at the mouth of a die pack having multiple dies defining passages. The cup is held in place by a redraw sleeve, which is part of a redraw assembly. As the punch/ram engages the cup, the cup is moved through a passage in a redraw die. The cup is then moved through a number of ironing dies. That is, the ironing dies are disposed behind, and axially aligned with, the redraw die. At the end of the die pack opposite the ram is a domer. The domer is a die structured to form a concave dome in the bottom of the cup/can body.

Generally, and as shown in FIG. 1, a bodymaker 1 includes a drive assembly 2 and a forming assembly 3. The drive assembly 2 includes a motor (not shown) that is operatively coupled to a rotating crank 4 having a flywheel (not numbered) coupled thereto of considerable mass for storing kinetic energy for metal forming such that the motor does not have to supply variable energy. The crank 4 is further coupled to a pivoting swing arm 5 by a first connecting rod 6A. The swing arm 5 is coupled, via a second connecting rod 6B, to a ram assembly 7. That is, the forming assembly 3 includes the ram assembly 7, a die pack 8 and a domer 9. The ram assembly 7 includes a carriage 7A and an elongated ram (or ram body) 7B and, in some embodiments, a punch 7C disposed at the distal end of the ram body 7B from the second connecting rod 6B. The die pack 8 includes a number of ironing dies (not numbered) which define a forming passage (not numbered). The ram body 7B/punch 7C is structured to, and does, reciprocate through the die pack 8. That is, the ram body 7B/punch 7C moves between a first position, wherein the ram body 7B/punch 7C is withdrawn from the die pack 8 (i.e., shifted to the right in FIG. 1), and a second position, wherein the ram body 7B/punch 7C extends through the die pack 8 to a position adjacent the domer 9 (i.e., shifted to the left in FIG. 1). As is known, a cup feeder, not numbered, positions a cup at the mouth, or upstream end, of the die pack 8 when the ram body 7B is in the first position. Thus, as the ram body 7B moves toward the second position, the ram body 7B/punch 7C moves the cup through the die pack 8 where it is formed into a can body. The use of a crank, a swing arm, and/or pivoting connecting rods in a bodymaker drive assembly is a problem. That is, there are many disadvantages associated with a crank/swing arm drive assembly in a bodymaker as discussed below.

For example, in this configuration, the circular motion of the crank 4 is converted into a reciprocal motion in the ram body 7B and punch 7C. The crank 4 rotates at speeds of about 320 r.p.m. to 400 r.p.m. and the ram body 7B/punch 7C reciprocates once during each cycle. A can body is formed during each cycle; thus, the bodymaker 1 makes about 320 to 400 cans per minute. That is, for each cycle of the drive assembly 2, i.e., each time the crank 4 rotates three hundred and sixty degrees (360°), the bodymaker 1 makes one can body. Alternatively, in an embodiment wherein the crank 4 drives two ram bodies 7B, the bodymaker 1 makes two can bodies during each cycle. As it is desirable to produce as many can bodies per minute as possible, the number of can bodies made per cycle is a problem. That is, it is desirable to have a bodymaker operating with a higher, or greater, output.

Operating at a higher speed, however, is difficult due to the limitations and characteristics of the elements of the bodymaker. For example, the ram and punch are made of metal, typically steel, and have a considerable mass. The drive assembly must be structured to move the mass of the ram and punch and to resist the forces generated by the moving ram and punch. Thus, as discussed above, the drive assembly is also, typically, made of metal/steel and, as such, also has a considerable mass. Further, the elements of the drive assembly are substantially rigid and coupled to each other at rotational and pivotal couplings. At this speed, and in this configuration, there are a number of detrimental effects on elements of the bodymaker drive assembly 2. That is, this configuration includes rigid, elongated elements (which include the swing arm 5, connecting rods 6A, 6B and ram body 7B) which are operatively engaged by a rotating element (i.e., the crank 4 and flywheel). As the rotational motion of the crank 4 is converted into the reciprocating motion of the ram body 7B, the rigid elements move and are either accelerating or decelerating (except for the instant wherein acceleration becomes deceleration). That is, the drive assembly and certain forming assembly elements are, essentially, either accelerating or decelerating and are, essentially, never moving at a constant velocity. This type of motion, i.e., not moving at a constant velocity, causes the distal end of the ram body, including the punch, to vibrate. This is a problem.

Further, a bodymaker in a drive assembly configured as described above, i.e., a crank operatively coupled to a swing arm that is further operatively coupled to a ram assembly, all of the elements are, essentially, in constant motion. That is, with the exception of the instant when the ram assembly reverses direction, the elements operatively coupled to the drive assembly are in constant motion. A bodymaker in this configuration has problems.

For example, the motion of the elongated elements of the drive assembly and/or the ram assembly is suddenly, or instantly, reversed from a forward motion to a rearward motion. This rapid change in the direction of the motion is, as used herein, "whiplash." At the forward end of the ram body 7B stroke, this effect causes an undesirable vibration in the ram body 7B which is transferred to the die pack 8. At the rearward end of the ram body 7B stroke, the rapid change in direction causes an undesirable vibration just before the punch 7C engages a cup. Further, at these speeds and with such rapid changes in the motion, the momentum of the various elements and the interaction between elements cause the elongated elements of the drive assembly to deform/elongate. This elongation, in turn, causes the position of the ram assembly 7 relative to the die pack 8 and domer 9 to change. More specifically, the distal end of the ram/punch will, essentially, be positioned beyond the domer. This condition is identified herein as "overstroke." That is, as used herein, the "overstroke" of the ram/punch means that when the ram is in the second position, the elongation of the ram (and/or other elements) position the distal end of the ram/punch further than is necessary to form the dome in the cup; i.e., the distal end of the ram/punch is positioned too close to the domer, which can damage the ram/punch, domer, and/or result in improperly formed can bodies. To prevent such overstroke and damage resulting therefrom, the positioning of forming arrangements of such prior art arrangements are typically adjusted for the maximum production speed, and thus positioned for the maximum deformations and not properly positioned for operation at lower speeds (and thus lower deformations). Accordingly, in order to avoid potential damage and/or improperly formed can bodies at less than maximum production speeds the flywheels of such arrangements have to be engaged to the forming ram motion mechanisms in no more than two strokes without making cans at speeds no less than 80% of the maximum speed required. Such engagement is rather abrupt and requires a strong clutch. These are problems.

It is noted that certain forming devices used in the process of making cans and/or can bodies, utilize a cam in the drive assembly. For example, "necker" machines, i.e., machines structured to form necks in can bodies, often utilize a fixed cam disk and rotating forming assemblies. That is, the cam disk is fixed to a housing or other mounting and a plurality of forming assemblies move about the cam. As the forming assemblies move, the forming assemblies engage the cam and the cam drives dies and other forming elements within the forming assemblies. Thus, the cam is static and the forming assemblies are dynamically mounted. That is, the entire forming assembly moves while the internal elements of the forming assemblies move relative to each other. Generally, the mounting assemblies for the forming assemblies are complex and are subject to wear and tear. This is a problem. That is, having a static cam and dynamically mounted forming assemblies is a problem.

Further, the drive assembly linkage of FIG. 1 as described above includes at least three rotational couplings that undergo a pivoting motion (connecting rod 6A/swing arm 5, swing arm 5/connecting rod 6B and connecting rod 6B/carriage 7A). These rotational couplings are hereinafter, and as used herein, identified as "pivotal" couplings. When maintenance is required, or when the drive assembly and the forming assembly are being swapped with another drive assembly and forming assembly to form can bodies with different characteristics, technicians must perform multiple decoupling/coupling operations at each rotational/pivotal coupling. The replacement of elements joined by pivotal couplings is a time consuming process. For example, while the drive assembly elements are being replaced, the bodymaker is not operational. As such, a drive assembly 2 that includes pivotal couplings is a problem.

Stated alternately, the drive assembly 2 drive device, i.e., the construct that generates motion (which is the motor in the embodiment described above) is operatively coupled to the ram assembly 7 via a multi-element linkage, i.e., crank 4/swing arm 5/first connecting rod 6A/second connecting rod 6B. Such a multi-element linkage cannot act as a "direct operative coupling element" between the motor and the ram assembly. This is a problem because as the number of elements increase, the cost, the weight of the drive assembly, and the energy required to operate the drive assembly increase.

Further, when the separate elements of the forming assembly are being installed, the elements must be carefully aligned with each other. For example, the ram must be aligned with the forming passage through the die pack and with the domer. As there are multiple elements in the forming assembly that are completely separate from each other, this process takes a considerable amount of time during which the bodymaker is not operational. This is a problem. That is, a forming assembly wherein the moving elements are not maintained in alignment with the stationary elements of the forming assembly is a problem.

It is understood that, as the speed of the drive assembly increases, these problems are intensified. Thus, there is a limit as to how many can bodies a bodymaker having such a drive assembly is able to form. One adaptation that allows for additional can bodies to be formed includes a second forming assembly. The second forming assembly includes a ram assembly that moves in opposition to the first forming assembly ram assembly. That is, generally, the crank is operatively coupled to two separate rams. When the first ram assembly is in the first position, the second ram assembly is in the second position, and, when the first ram assembly is in the second position, the second ram assembly is in the first position. Thus, the rams are generally moving in opposition to each other. This configuration effectively doubles the output of the bodymaker. The problem with this configuration is that when one ram assembly needs to be replaced or repaired, both ram assemblies are non-operational. That is, due to balance and similar issues, it is not possible to operate the bodymaker with less than all forming assemblies/ram assemblies coupled to the drive assembly. This is a problem.

Further, in such a bodymaker with two rams generally moving in opposition to each other, certain actions occur simultaneously, or near simultaneously, such as the reversal in the direction the ram is moving. Thus, both rams experience "whiplash" at the same time. This is a problem because such simultaneous actions generate an undesirable vibration and, moreover, this vibration is more intense than in a bodymaker with a single ram. That is, it is not desirable to have vibration generating actions occur at the same time to different ram bodies. This is a problem.

Further, when the elements of the drive assembly and/or ram assembly are in constant motion, the length of the ram stroke, i.e., the distance between the first and second positions, must be larger. That is, as described above, prior to being formed in the die pack, a cup must be positioned in front of the ram/punch at the die pack. Generally a cup feeder, or similar device, is structured to start moving a cup into position, i.e., at the mouth of the die pack, as soon as the ram has withdrawn from the die pack. As the ram is in constant motion, the ram must be moving the entire time the cup is being positioned. That is, the ram cannot stop once it is retracted from the die pack. Thus, the ram stroke length must have a sufficient length so that there is enough time for a cup to be placed at the mouth of the die pack prior to the ram moving forward to engage the cup and move the cup through the die pack. Thus, the stroke length is a problem.

For a 12 ounce standard beverage can body, the ram assembly travels over a distance of nineteen inches to twenty-four inches or sometimes more. That is, for example, the distal end of the ram body 7B moves a distance of nineteen inches to twenty-four inches or more as the ram body 7B moves from the retracted, first position to the extended, second position; the distance the ram moves is, as used herein, the "stroke length." The longer the stroke length, the larger/longer the elements of the drive assembly must be. Larger/longer elements require more energy to move. This is a problem. Smaller/shorter elements are desirable. That is, smaller/shorter elements generate a shorter stroke length and have a reduced weight. Elements that have a reduced weight require less energy to operate. Thus, a bodymaker with a shorter stroke length is desirable and would solve these problems.

There is, therefore, a need for a bodymaker drive assembly that does not include either a crank, a swing arm, and/or pivoting connecting rods. There is a further need for a bodymaker that is structured to produce one of a large number of can bodies per minute, a very large number of can bodies per minute, or an exceedingly large number of can bodies per minute. There is a further need for a bodymaker drive assembly wherein the drive assembly imparts a motion to the forming assembly wherein at least some of the motion is at a constant velocity. There is a further need for a bodymaker drive assembly that does not create a sudden, or instant, change in the direction of the movable forming assembly elements, i.e., a bodymaker drive assembly that is structured to cause the movable forming assembly elements to dwell prior to changing directions. There is a further need for a bodymaker drive assembly that does not include pivotal couplings. There is a further need for a bodymaker with a unified forming assembly. There is a further need for a bodymaker having a plurality of forming assemblies wherein, if less than all of the forming assemblies are engaged, the bodymaker is still operational. There is a further need for a bodymaker drive assembly having a reduced stroke length.

Another manner of increasing the output of the bodymaker is to include multiple rams that are driven by a single drive assembly. That is, certain bodymakers include multiple drive assemblies wherein each drive assembly is associated with an independent ram. These are, essentially, independent bodymakers that have separate drive assemblies linked together. This is done so that the timing of the coupled bodymakers can be controlled. Bodymakers in this configuration do not include multiple rams that are driven by a single drive assembly. Other bodymakers, however, have a single drive assembly that is structured to, and does, drive multiple rams.

For example, U.S. Pat. No. 9,162,274 discloses a double-action bodymaker having a single motor that is coupled to a crank having offset journals which are further coupled to two separate rams. The two rams move in opposition, and in opposite directions, relative to each other. More specifically, when compared to the bodymaker described above, the double-action bodymaker includes a single motor, a single crank (with two journals), two swing levers and two rams. The rams extend in generally opposite directions and move in opposition to each other. That is, when one ram is in the first position, the second ram is in the second position. Moreover, a bodymaker in this configuration includes two pivoting elements, i.e., the swing levers.

As an alternate example, U.S. Pat. No. 10,343,208 discloses a vertical bodymaker having a single motor that is coupled, via a single crank with offset journals, to two separate ram assemblies. The rams move in opposition, but in the same direction, relative to each other. More specifically, when compared to the bodymaker described above, the vertical bodymaker includes a single motor, a single crank (with two journals), two connecting rods and two ram assemblies. U.S. Pat. No. 10,343,208 notes that the bodymaker, in an embodiment that is not shown, includes more than two ram assemblies. In this configuration there would be, for example, two synchronized ram assemblies moving toward the second position at the same time, and two synchronized ram assemblies moving toward the first position at the same time. That is, the pairs of ram assemblies move in opposition to each other.

As another alternate example, U.S. Pat. No. 7,882,721 discloses a bodymaker having a single motor coupled to a gearbox having a crank arm that is operatively coupled to two ram assemblies. In this configuration, the two rams move in opposition, and in opposite directions, relative to each other.

The swing levers in U.S. Pat. No. 9,162,274 and the connecting rods in U.S. Pat. No. 10,343,208 are substantially similar to the "swing arm 5" of FIG. 1, described above. That is, the combination of the crank and the "swing arm 5," and/or the similar elements noted above, are the constructs that convert the rotational motion of the motor output shaft to a reciprocal motion in the rams. It is understood that guides and other constructs control, or limit, the path over which the ram travels, but the crank/swing arms (or similar constructs) are the elements that convert the rotational motion of the motor output shaft to a reciprocal motion in the rams. Similarly, the gearbox of U.S. Pat. No. 7,882,721 converts the rotational motion of the motor output shaft to a reciprocal motion in the rams. Such configurations are a problem in that the motor must drive multiple elements so as to convert the rotational motion of the motor output shaft to a reciprocal motion in the ram. That is, the crank/swing arms/gearbox elements are heavy; thus the motor must be more robust, i.e., able to drive heavy elements. Such motors are expensive. Further, the crank/swing arms/gearbox are prone to wear and tear. Thus, a bodymaker with multiple swing arms or a gearbox is more expensive to maintain. These are problems with the prior art.

Further, in such bodymakers, the drive assembly is structured, i.e., balanced, to operate the ram assemblies at the same time. That is, for example, if one of the two ram assemblies is not in operation, the bodymaker cannot be used with one ram assembly as the loads/reactive loads are unbalanced which causes the drive assembly to become inoperable.

Further, while it is desirable to increase the output of a bodymaker, it is not desirable to increase the floor space required by the bodymaker. That is, for example, a single Standun Bodymaker (manufactured by Stolle Machinery Company, LLC) arrangement, such as generally shown in FIG. 1, occupies about 333 square feet. Ostensibly, one could provide a single housing for two such bodymakers and assert that the output has doubled. But it is understood that the floor space required by such a bodymaker would be about double the floor space required by one such bodymaker. This is a problem. That is, increasing the output of a bodymaker while limiting the floor space required by one such bodymaker is a problem.

There is, therefore, a need for a bodymaker with a direct ram drive assembly, i.e., a ram drive assembly that does not include a swing arm or a gearbox. There is a further need for a bodymaker with a ram drive assembly structured to operate wherein no two ram bodies are in the same medial position at one time and/or wherein the forming assemblies are asymmetrical forming assemblies. There is a further need for a bodymaker with a ram drive assembly structured to operate with less than a full set of forming assemblies. That is, there is a further need for a bodymaker with a limited load ram drive. There is a further need for a bodymaker structured to produce one of a large number of can bodies per minute, a very large number of can bodies per minute, or an exceedingly large number of can bodies per minute. There is a further need for such a bodymaker to occupy a reduced floor space. There is a further need for such a bodymaker to have a single source/multiple output ram drive assembly. The bodymaker as described below and variations thereof solve the stated problems.

SUMMARY

These needs, and others, are met by at least one embodiment of the disclosed concept that provides a cam follower assembly for a can bodymaker, the cam follower assembly comprising: a slider structured to be coupled to the proximal end of a ram body of a can bodymaker; and a plurality of cam follower members rotatably coupled to the slider, wherein the cam follower members are structured to be operatively coupled to a cam of a ram drive assembly.

The cam follower assembly may further comprise a cam follower bearing assembly having a number of hydrostatic/hydrodynamic bearing pads positioned and structured to engage with corresponding, cooperatively positioned, bearing members.

Each bearing pad may include a recessed bearing pocket that is structured to generally house a pressurized supply of bearing fluid provided therein.

The slider may comprise a slider body and an upper frame portion extending upward from the slider body, and the number of hydrostatic/hydrodynamic bearing pads may be provided on the upper frame portion.

The upper frame portion of the slider body may comprise: a first member extending upward generally from at or near a first edge of the slider body; a second member extending upward generally from at or near a second edge of the slider body; and a third member extending between the first and second members and spaced a distance above the slider body.

The number of hydrostatic/hydrodynamic bearing pads may include: a first bearing pad coupled to an outward facing face of the first member; a second bearing pad coupled to an outward facing face of the second member; and a third bearing pad coupled to an upward facing face of the third member.

The slider may further comprise a lower frame portion extending downward from the slider body.

The lower frame portion may comprise: a first member extending downward generally from at or near a first edge of the slider body; a second member extending downward generally from at or near a second edge of slider body opposite the first edge; and a third member extending between the first and second members and spaced a distance below the slider body.

Each of the cam followers may comprise a roller bearing.

One of the roller bearings may include an eccentric bushing positionable between a first positioning, wherein the one roller bearing is disposed a first distance from another one of the plurality of roller bearings, and a second positioning, wherein the one roller bearing is disposed a second distance, different than the first distance, from the other one of the plurality of roller bearings.

As another embodiment of the disclosed concept, a moving assembly for a can bodymaker comprises: a ram assembly including an elongated ram body having a proximal end and an opposite distal end; and a cam follower assembly such as previously described.

As yet a further embodiment of the disclosed concept, a can bodymaker comprises: a ram drive assembly including one of a disk cam or a barrel cam; and a moving assembly such as previously described.

BRIEF DESCRIPTION OF THE DRAWINGS

A full understanding of the disclosed concept can be gained from the following description of the preferred embodiments when read in conjunction with the accompanying drawings in which:

FIG. 7A is a schematic top view of a ram guide assembly in accordance with one example embodiment of the disclosed concept shown with a portion removed to show details below. FIG. 7B is a schematic cross-sectional side elevation view of the ram guide assembly of FIG. 7A as indicated in FIG. 7A. FIG. 7C is a schematic cross-sectional elevation view of the ram guide assembly of FIGS. 7A and 7B as indicated in FIG. 7A. FIG. 7D is a schematic perspective view of a portion of the cam follower of the ram guide assembly of FIGS. 7A-7C.

FIG. 10 is a schematic top view of a bodymaker with two forming assemblies driven by a barrel cam in accordance with one example embodiment of the disclosed concept.

FIG. 12 is a schematic top view of a cam in accordance with one example embodiment of the disclosed concept.

DESCRIPTION OF THE PREFERRED EMBODIMENTS

Figure 1:
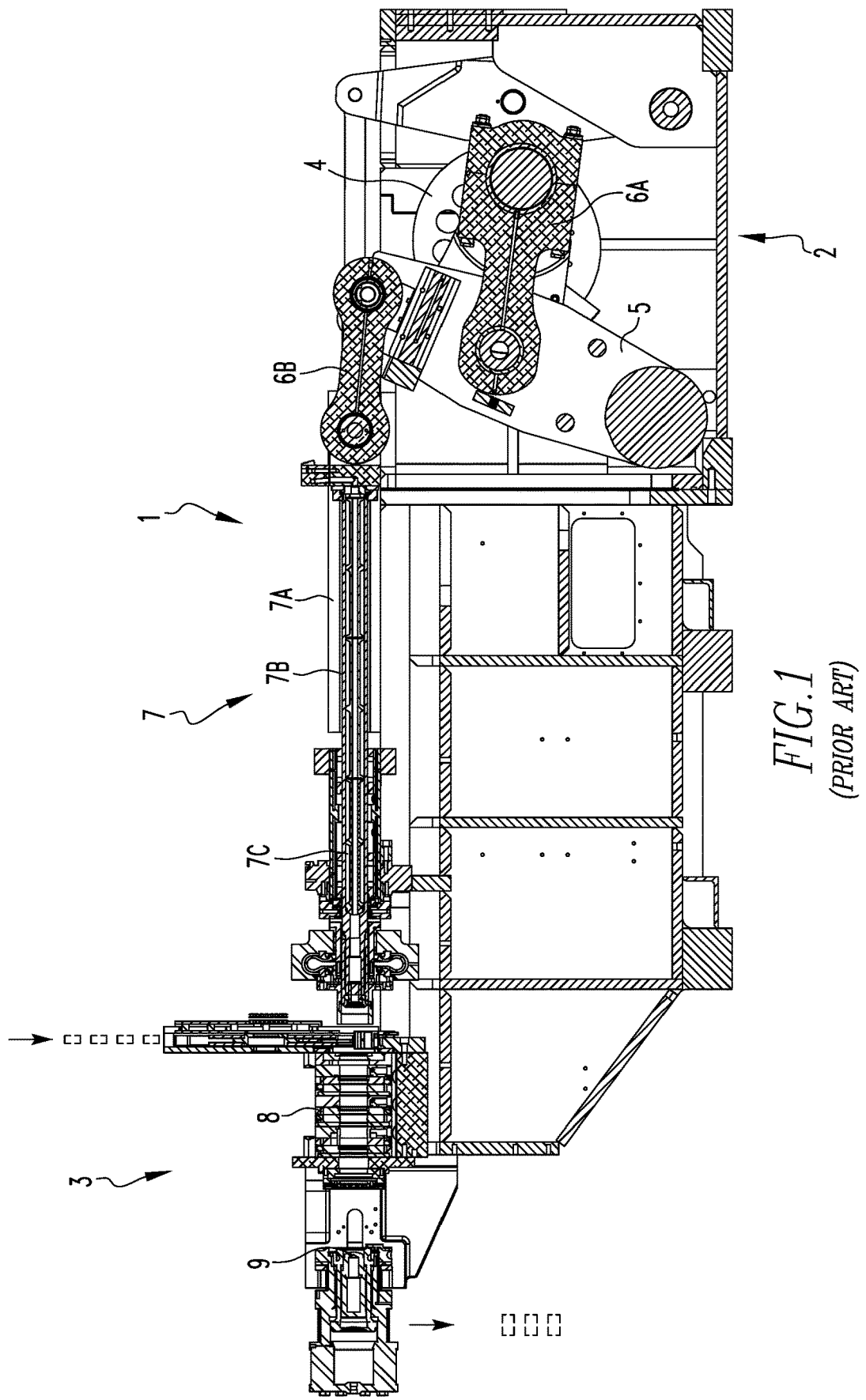
FIG. 1 is a schematic side elevation view of a prior art bodymaker.

It will be appreciated that the specific elements and embodiments illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "movably coupled" means that two elements are coupled in a manner such that at least some movement of one or both of the elements with respect to the other element is permitted without uncoupling the elements. For example, a door is "movably coupled" to a door frame by one or more hinges.

As used herein, "selectively coupled" means that two or more elements are coupled in a manner which may be readily undone without causing damage to either of such elements. For example, two elements that are bolted or screwed together are "selectively coupled", while two elements that are glued or welded together are not "selectively coupled" as used herein.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, in a term such as, but not limited to, "[X] structured to [verb] [Y]," the "[Y]" is not a recited element. Rather, "[Y]" further defines the structure of "[X]." That is, assume in the following two examples "[X]" is "a mounting" and the [verb] is "support." In a first example, the full term is "a mounting structured to support a flying bird." That is, in this example, "[Y]" is "a flying bird." It is known that flying birds, as opposed to swimming birds or walking birds, typically grasp a branch for support. Thus, for a mounting, i.e., "[X]," to be "structured" to support a bird, the mounting is shaped and sized to be something a bird is able to grasp similar to a branch. This does not mean, however, that the bird is a recited element. In a second example, "[Y]" is a house; that is the second exemplary term is "a mounting structured to support a house." In this example, the mounting is structured as a foundation as it is well known that houses are supported by foundations. As before, the house is not a recited element, but rather defines the shape, size, and configuration of the mounting, i.e., the shape, size, and configuration of "[X]" in the term "[X] structured to [verb] [Y]."

As used herein, "associated" means that the elements are part of the same assembly and/or operate together, or, act upon/with each other in some manner. For example, an automobile has four tires and four hubcaps. While all the elements are coupled as part of the automobile, it is understood that each hubcap is "associated" with a specific tire.

As used herein, a "coupling assembly" includes two or more couplings or coupling components. The components of a coupling or coupling assembly are generally not part of the same element or other component. As such, the components of a "coupling assembly" may not be described at the same time in the following description.

Further, as used herein, a "cooperative coupling" or a "cooperative coupling assembly" includes two or more couplings or coupling components. The components of a cooperative coupling assembly are generally not part of the same element or other component. As such, the components of a "cooperative coupling assembly" may not be described at the same time in the following description. "Cooperative coupling assemblies" include, but are not limited to, (1) a combination of a nut, a bolt and passages in other elements through which the bolt extends, (2) a screw/rivet and passages in other elements through which the screw/rivet extend, and (3) tongue-and-groove assemblies.

As used herein, a "unilateral coupling" or a "unilateral coupling assembly" means a construct that is structured to be coupled to another element or assembly wherein the other element or assembly is not structured to be coupled to the "unilateral coupling." "Unilateral coupling assemblies" include, but are not limited to clamps, tension members (e.g., a rope), and adhesive constructs. Further, it is understood that the nature of such constructs as a "unilateral coupling assembly" depend upon the other element to which the coupling assembly is coupled. That is, for example, reins on a horse are a "unilateral coupling" when coupled to a tree because the tree is not a construct that is structured to be coupled to the reins. Conversely, reins on a horse are a "cooperative coupling" when coupled to a hitching post because a hitching post is a construct that is structured to be coupled to the reins.

As used herein, a "coupling" or "coupling component(s)" is one or more component(s) of a "coupling assembly," i.e., either a "cooperative coupling" or a "unilateral coupling." That is, a cooperative coupling assembly includes at least two components that are structured to be coupled together. It is understood that the components of a cooperative coupling assembly are compatible with each other. For example, in a cooperative coupling assembly, if one coupling component is a snap socket, the other cooperative coupling component is a snap plug, or, if one cooperative coupling component is a bolt, then the other cooperative coupling component is a nut (as well as an opening through which the bolt extends) or threaded bore. In a "unilateral coupling," the "coupling" or "coupling component" is the construct that is structured to be coupled to another construct. For example, given a rope with a loop formed thereon, the loop in the rope is the "coupling" or "coupling component."

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "temporarily disposed" means that a first element(s) or assembly (ies) is(are) resting on a second element(s) or assembly(ies) in a manner that allows the first element/assembly to be moved without having to decouple or otherwise manipulate the first element. For example, a book simply resting on a table, i.e., the book is not glued or fastened to the table, is "temporarily disposed" on the table.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true. With regard to electronic devices, a first electronic device is "operatively coupled" to a second electronic device when the first electronic device is structured to, and does, send a signal or current to the second electronic device causing the second electronic device to actuate or otherwise become powered or active.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "temporarily coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening is made from a deformable or compressible material, the opening may even be slightly smaller than the component being inserted into the opening. With regard to surfaces, shapes, and lines, two, or more, "corresponding" surfaces, shapes, or lines have generally the same size, shape, and contours. With regard to elements/assemblies that are movable or configurable, "corresponding" means that when elements/assemblies are related and that as one element/assembly is moved/reconfigured, then the other element/assembly is also moved/reconfigured in a predetermined manner. For example, a lever including a central fulcrum and elongated board, i.e., a "see-saw" or "teeter-totter," the board has a first end and a second end. When the board first end is in a raised position, the board second end is in a lowered position. When the board first end is moved to a lowered position, the board second end moves to a "corresponding" raised position. Alternately, a cam shaft in an engine has a first lobe operatively coupled to a first piston.

When the first lobe moves to its upward position, the first piston moves to a "corresponding" upper position, and, when the first lobe moves to a lower position, the first piston, moves to a "corresponding" lower position.

As used herein, a "path of travel" or "path," when used in association with an element that moves, includes the space an element moves through when in motion. As such, any element that moves inherently has a "path of travel" or "path." Further, a "path of travel" or "path" relates to a motion of one identifiable construct as a whole relative to another object. For example, assuming a perfectly smooth road, a rotating wheel (an identifiable construct) on an automobile generally does not move relative to the body (another object) of the automobile. That is, the wheel, as a whole, does not change its position relative to, for example, the adjacent fender. Thus, a rotating wheel does not have a "path of travel" or "path" relative to the body of the automobile. Conversely, the air inlet valve on that wheel (an identifiable construct) does have a "path of travel" or "path" relative to the body of the automobile. That is, while the wheel rotates and is in motion, the air inlet valve, as a whole, moves relative to the body of the automobile.

As used herein, a "planar body" or "planar member" is a generally thin element including opposed, wide, generally parallel surfaces, i.e., the planar surfaces of the planar member, as well as a thinner edge surface extending between the wide parallel surfaces. That is, as used herein, it is inherent that a "planar" element has two opposed planar surfaces with an edge surface extending therebetween. The perimeter, and therefore the edge surface, may include generally straight portions, e.g., as on a rectangular planar member such as on a credit card, or be curved, as on a disk such as on a coin, or have any other shape.

As used herein, the word "unitary" means a component that is created as a single piece or unit. That is, a component that includes pieces that are created separately and then coupled together as a unit is not a "unitary" component or body.

As used herein, "unified" means that all the elements of an assembly are disposed in a single location and/or within a single housing, frame or similar construct.

As used herein, the term "number" shall mean one or an integer greater than one (i.e., a plurality). That is, for example, the phrase "a number of elements" means one element or a plurality of elements. It is specifically noted that the term "a 'number' of [X]" includes a single [X].

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending generally perpendicular to a height line passing through the center. That is, generally, for a cylindrical soup can, the "radial side/surface" is the generally circular sidewall and the "axial side(s)/surface(s)" are the top and bottom of the soup can. Further, as used herein, "radially extending" means extending in a radial direction or along a radial line. That is, for example, a "radially extending" line extends from the center of the circle or cylinder toward the radial side/surface. Further, as used herein, "axially extending" means extending in the axial direction or along an axial line. That is, for example, an "axially extending" line extends from the bottom of a cylinder toward the top of the cylinder and substantially parallel to, or along, a central longitudinal axis of the cylinder.

As used herein, a "tension member" is a construct that has a maximum length when exposed to tension, but is otherwise substantially flexible, such as, but not limited to, a chain or a cable.

As used herein, "generally curvilinear" includes elements having multiple curved portions, combinations of curved portions and planar portions, and a plurality of linear/planar portions or segments disposed at angles relative to each other thereby forming a curve.

As used herein, an "elongated" element inherently includes a longitudinal axis and/or longitudinal line extending in the direction of the elongation.

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, "generally" means "in a general manner" relevant to the term being modified as would be understood by one of ordinary skill in the art.

As used herein, "substantially" means "by a large amount or degree" relevant to the term being modified as would be understood by one of ordinary skill in the art.

As used herein, "at" means on and/or near relevant to the term being modified as would be understood by one of ordinary skill in the art.

As used herein, a "standard beverage can" or "standard beverage can body" means a generally cylindrical, aluminum can body for a twelve ounce beverage such as, but not limited to, soda or beer. A "standard beverage can" includes, but is not limited to, a "202 beverage can" and cans having a similar shape. See, http://www.cancentral.com/beverage-cans/standards.

As used herein, a "dynamic" element is an element that moves during the formation of a can body. Conversely, a "static" element is an element that does not move during the formation of a can body.

As used herein, "cooperative" cam surfaces mean two cam surfaces that extend generally parallel to each other and which are structured to be, and/or are, operatively coupled to the same element or assembly. For example, the inner radial surface and the outer radial surface on a generally toroid cam body wherein the two surfaces impart a motion to the same element or assembly are "cooperative" cam surfaces. That is, the inner radial surface and the outer radial surface extend generally parallel to each other. It is understood that the "cooperative" cam surfaces do not necessarily operatively engage the other element or assembly at the same time. That is, when the "cooperative" cam surfaces are defined by a ridge, the "cooperative" cam surfaces do not operatively engage the other element or assembly at the same time. Conversely, when the "cooperative" cam surfaces are defined by a groove, the "cooperative" cam surfaces selectively, operatively engage the other element or assembly at the same time. That is, when the "cooperative" cam surfaces are defined by a groove, the "cooperative" cam surfaces, or portions thereof, are structured to both operatively engage the other element or assembly at the same time, or, are structured to individually operatively engage the other element or assembly at a given time.

As used herein, a "direct" [ram] drive assembly means a drive assembly for a ram assembly wherein a rotational motion is converted to a reciprocal motion without a pivoting construct such as, but not limited to, a swing arm.

Further, a "direct" [ram] drive assembly means a drive assembly for a ram assembly wherein a rotational motion is converted to a reciprocal motion without a gear box structured to convert rotational motion to a reciprocal motion. That is, to be a "direct" drive assembly, the moving elements of the drive assembly either rotate with, or otherwise correspond to the rotation of, a motor output shaft, or, move generally linearly with the ram assembly. As used herein, to "rotate with, or otherwise correspond to the rotation of, a motor output shaft" does not include a reciprocal pivoting motion that corresponds to the rotation of a motor output shaft. As used herein, to "move generally linearly with the ram assembly" means that an element moves over a path that is generally parallel to, or aligned with, the path of the ram assembly. As used herein, a pivoting construct such as, but not limited to, a swing arm cannot "move generally linearly with the ram assembly."

As used herein, a "single source/[X]-output ram drive assembly" means that the drive assembly includes a single motor, or similar construct that generates motion, that is operatively coupled to [X] forming assemblies where "[X]" is an integer greater than one. Further, a "single motor" means a single construct or assembly that generates motion and which is the only such construct that is operatively coupled to the forming assemblies. That is, as a counter example, a bodymaker with a drive assembly having two motors disposed in an enclosure wherein each motor is coupled to a ram may be described as having a single "drive assembly" (as the motors are disposed in an enclosure), but the drive assembly is not a "single source/[X]-output ram drive assembly" because neither motor is the "single construct or assembly that generates motion and which is the only such construct that is operatively coupled to the forming assemblies." Stated alternately, merely coupling multiple motors to a housing or similar construct does not convert the multiple motors into a "single source/[X]-output ram drive assembly."

As used herein, a "prime axis of rotation" for a bodymaker ram drive assembly means an axis of rotation of a rotating ram drive assembly element wherein that element is operatively coupled to a plurality of ram assemblies/ram bodies. It is noted that in a bodymaker drive assembly with a crank operatively coupled to two swing arms, and each swing arm coupled to separate connecting rods, and each connecting rod coupled to a separate ram assembly/ram body, the couplings between the connecting rod and a ram assembly/ram body is not a "prime axis of rotation" as the connecting rod is operatively coupled to a single ram assembly/ram body. Further, a "prime axis of rotation" means that the rotating element rotates rather than pivots. That is, for example, a bodymaker crank may have a "prime axis of rotation" but a bodymaker pivoting swing arm can never have a "prime axis of rotation."

As noted above, a ram body moves between a retracted, first position and an extended, second position. Further, a ram body moves over a path with a number of medial positions between the first position and the second position. Thus, as used herein, a ram assembly or a ram body in a "medial position" means that the ram assembly or a ram body is disposed at a position between the first position and the second position. Further, a ram assembly or a ram body in a "medial position" means that the ram assembly or the ram body is moving toward either the first position or the second position. The direction the ram assembly or the ram body is moving is, when needed, indicated by the terms "forward" or "rearward." That is, when the ram body is moving toward the second position and is in a medial position, the ram body is, as used herein, in a "forward" medial position. The term "forward" indicates the direction associated with the ram assembly or a ram body in a medial position. Conversely, when the ram assembly or the ram body is moving toward the first position and is in a medial position, the ram assembly or the ram body is, as used herein, in a "rearward" medial position. That is, the term "rearward" indicates the direction associated with the ram assembly or the ram body in a medial position. As noted, the terms "forward" and "rearward" are used when needed for clarity. Thus, as used herein, the statement that, "no two ram bodies are in the same medial position at one time" includes a configuration wherein two different ram assemblies/ram bodies are at the midpoint between the first and second positions, but wherein the two different ram assemblies/ram bodies are moving in different directions.

Further, it is understood that, and as used herein, when the ram body is exactly at the first or second position, the ram body is not moving forward or rearward; thus, a ram body at the first or second position does not have an associated direction. Further, a medial "position" is selectively identified by "[X]%" wherein the percentage means the portion of the path between the two end positions. That is, for example, a ram body at the "forward 25%" position means that the ram body is moving toward the second position and has traveled 25%, i.e., one quarter, of the distance between the first and second positon. As a further example, a ram body at the "rearward 50%" position means that the ram body is moving toward the first position and has traveled 50%, i.e., one half, of the distance between the first and second positon. Further, a ram assembly that is in a "forward" medial position is, depending upon the position of the blank/cup, in a "forming" position. That is, as used herein, the "forming" position occurs when the blank/cup is moving through the bodymaker die pack.

Referring now to FIGS. 2-6, a can bodymaker 10 in accordance with one example embodiment of the disclosed concept is shown. The bodymaker 10 includes a forming system 12 and a mounting assembly 14. The forming system 12 includes a number of forming assemblies 16 (four are shown in the example of FIGS. 2-6, labeled 16A-16D) and a ram drive assembly 300. In one exemplary embodiment, the bodymaker 10 and/or each forming assembly 16 is structured to, and does, form standard beverage can bodies. The mounting assembly 14 is structured to, and does, support the number of forming assemblies 16. The mounting assembly 14 is further structured to, and does, rotatably support a cam 330, discussed below, of the ram drive assembly 300. In one exemplary embodiment, the mounting assembly 14 includes a generally planar mounting assembly body 18.

Figure 3:
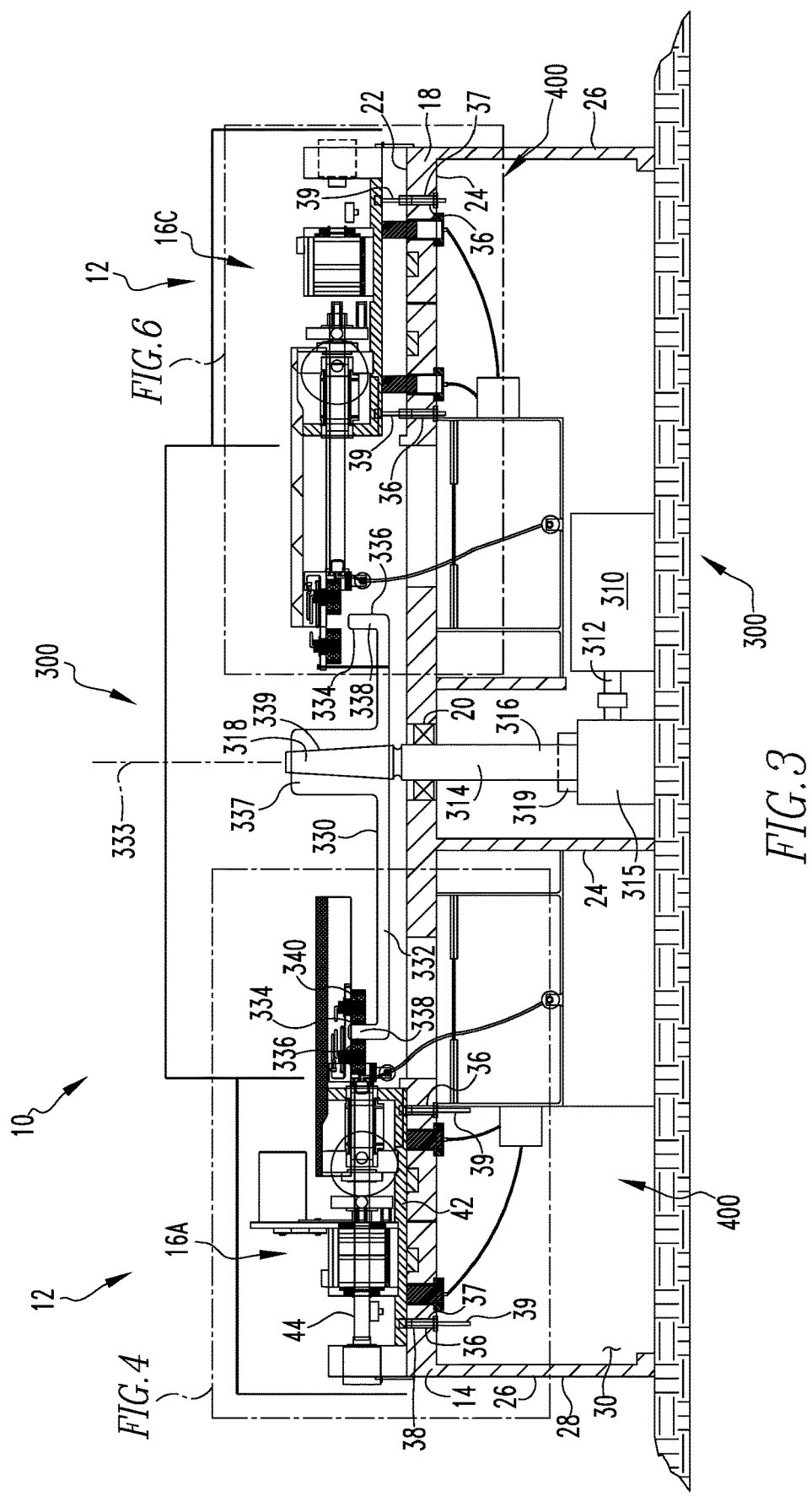
FIG. 3 is a schematic partially-sectional side elevation view of the bodymaker of FIG. 2 taken along the line identified in FIG. 2.

Referring to FIG. 3, the mounting assembly body 18 is oriented to be generally horizontal and includes an upper, first surface 22 and a lower, second surface 24 opposite the first surface 30. Further, and for a bodymaker 10 including four forming assemblies 16A, 16B, 16C, 16D, the mounting assembly body 18 is generally square. It is understood that the shape of the mounting assembly body 18 may be varied so long as the mounting assembly body 18 is structured to support the number of forming assemblies 16. In an exemplary embodiment, the mounting assembly body 18 defines a generally centrally disposed passage 20 that extends between the first and second surfaces 22 and 24 of the mounting assembly body 18.

Continuing to refer to FIG. 3, in the exemplary embodiment shown, the mounting assembly 14 further includes a number of depending element(s) 26 disposed at the perimeter of the mounting assembly body 18. If there is a single mounting assembly depending element 26 extending about the perimeter of the mounting assembly body 18, the single mounting assembly depending element 26 forms a housing 28 defining an enclosed space 30 under the mounting assembly body 18. If there are a plurality of relatively thin, spaced separate mounting assembly depending elements 26, the separate mounting assembly depending elements 26 are identified herein as "legs," similar to table legs. The mounting assembly depending element(s) 26 are structured to, and do, support the mounting assembly body 18 and elements disposed thereon.

Further, in an example embodiment, the first surface 22 of the mounting assembly body 18 defines a number of recesses 34 (FIGS. 4 and 6), each recess 34 being for a corresponding forming assembly 16. In an exemplary embodiment, each recess 34 is a "machined" recess 34. As used herein, a "machined" recess means a recess having contours structured to specifically position a forming assembly 16 on the mounting assembly body 18, and thus specifically position the forming assembly 16 relative to the ram drive assembly 300 and the cam 330. As used herein, "specifically position" means to position a forming assembly 16 relative to the ram drive assembly 300 and the cam 330 in a manner wherein further positioning of the forming assembly 16, and/or elements thereof, relative to the ram drive assembly 300 is not required. That is, while typically not mentioned in references/patents, it is well known that the position of elements of a forming assembly 16 are adjusted following installation so as to ensure proper alignment of the elements. Thus, unless the lack of adjustment of the forming assembly 16 (or elements thereof) relative to the ram drive assembly 300 (or elements thereof) is specifically mentioned in a reference/patent, then the reference/patent does not disclose a configuration wherein the forming assembly 16, and/or elements thereof, are "specifically position[ed]." That is, unless the lack of adjustment of the forming assembly 16, and/or elements thereof, is specifically mentioned in a reference/patent, then the reference/patent does not disclose a "machined" recess, as used herein.

Further, in another exemplary embodiment, each recess 34 includes a number, and as shown a plurality, of guide pin passages 36 defined in, and extending through the mounting assembly body 18. Each guide pin passage 36 has a cross-sectional area structured to accommodate a guide bushing 37. Each guide bushing 37 includes a toroid body 38. Each guide bushing 37 is disposed in a corresponding passage 36. Each guide bushing 37 is structured to allow a guide pin 39 to be passed therethrough.

Figure 2:
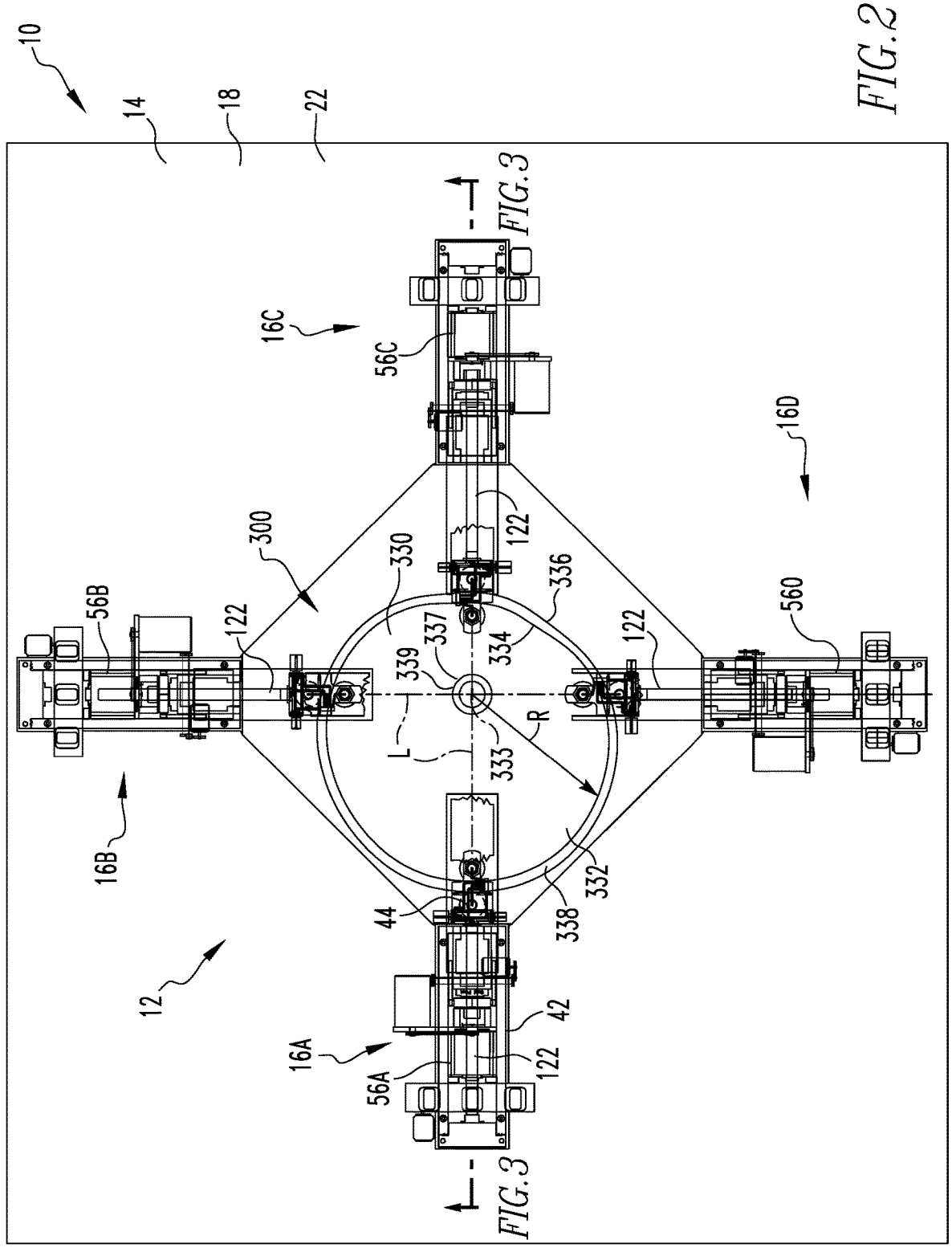
FIG. 2 is a schematic top view of a bodymaker with four forming assemblies driven by a disk cam in accordance with one example embodiment of the disclosed concept.

The forming assemblies 16 are substantially similar and as such only one is described in detail herein. As previously mentioned, it is noted that the different forming assemblies 16 shown in the Figures are identified by additional letters. Thus, when there are four forming assemblies 16, such as shown in the example of FIG. 2, the separate forming assemblies 16 are identified as forming assemblies 16A, 16B, 16C, 16D. This numbering convention applies to the elements of the forming assemblies 16A, 16B, 16C, 16D as well. That is, while the generic, single forming assembly 16 is described as having a die pack 56, the first forming assembly 16A has a die pack 56A and the second forming assembly 16B has a die pack 56B, and so forth.

Figure 4:
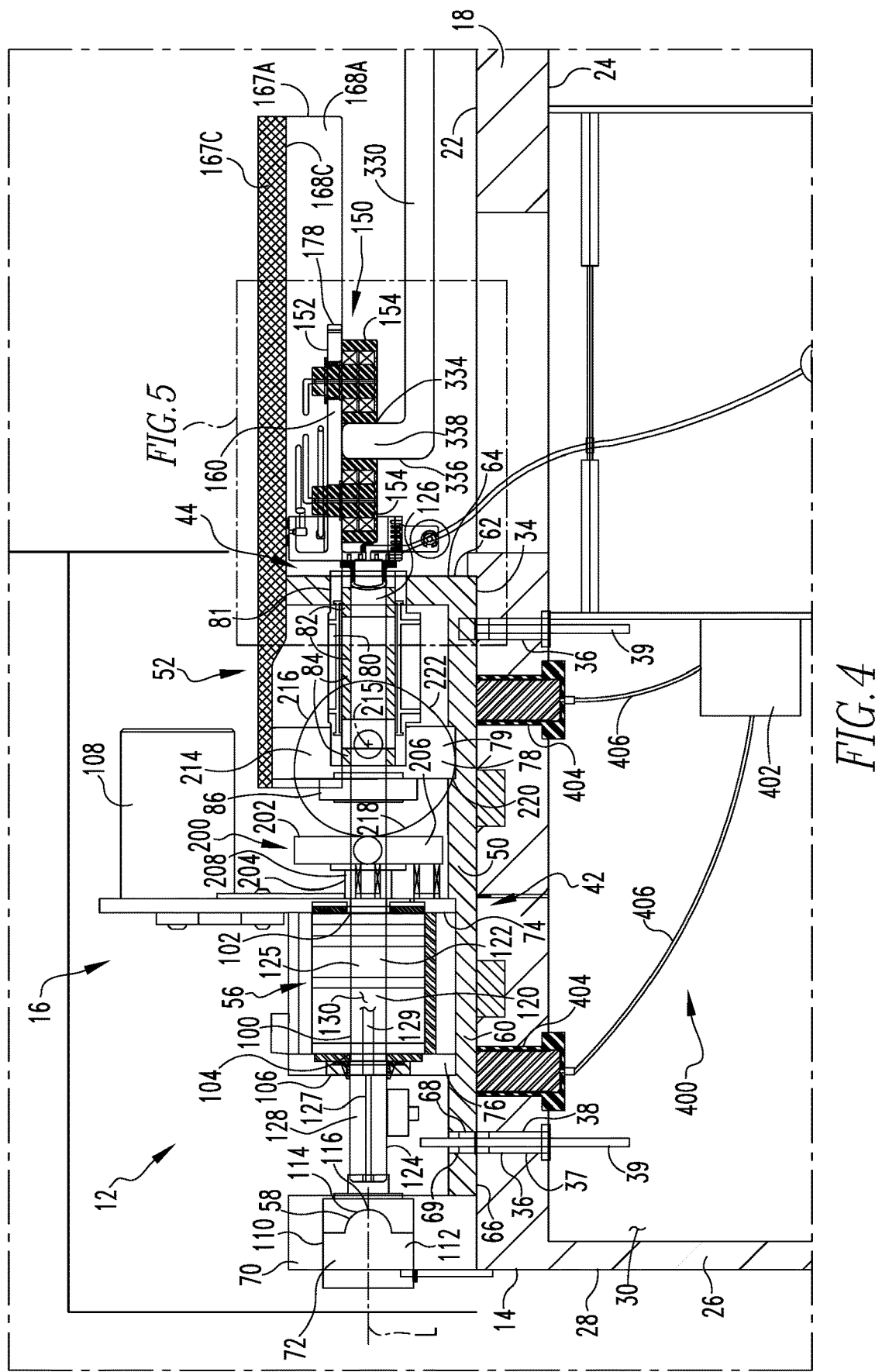
FIG. 4 is a schematic detail cross-sectional side elevation view of a forming assembly of the bodymaker of FIGS. 2 and 3, as indicated in FIG. 3, shown in an operational engaged position with the disk cam.

Referring now to FIGS. 3 and 4, a forming assembly 16 includes a stationary assembly 42 and a moving assembly 44. In one example embodiment, not shown, the stationary assembly 42 is coupled, directly coupled, or fixed to the first surface 22 of the mounting assembly body 18, and the moving assembly 44 is movably coupled to the first surface 22 of the mounting assembly body 18 via the stationary assembly 42. In the embodiment shown, and as described below, the stationary assembly 42 and the moving assembly 44 are a "unified" assembly that is structured to be, and is, temporarily coupled to the mounting assembly body 18. That is, the elements of the stationary assembly 42 and the moving assembly 44 are coupled, directly coupled, or fixed to each other. Further, the stationary assembly 42 and the moving assembly 44 are structured to be, and are, temporarily coupled to a stationary assembly base 50, as discussed below. In this configuration, the forming assembly 16 is a unified assembly.

As shown in the example embodiment of FIG. 4, the stationary assembly 42 of the forming assembly 16 includes the stationary assembly base 50, a ram guide assembly 52, a redraw assembly 200, a die pack 56 and a domer 58. The base 50 includes a generally planar member 60 with a number of upwardly depending, generally planar supports 62. The planar member 60 is structured to, i.e., is machined to, substantially correspond to the recess 34 defined in the first surface 22 of the mounting assembly body 18. The planar member 60 has a proximal end 64 and a distal end 66. When the forming assembly 16 is operatively coupled to the ram drive assembly 300, the proximal end 64 of the planar member 60 is the end closer to the cam 330 of the ram drive assembly 300 and the distal end 66 of the planar member 60 is the end further from the cam 330 of the ram drive assembly 300.

In one example embodiment, the planar member 60 includes a number, and as shown a plurality, of guide pin passages 68 extending through the planar member 60 of the base 50 of the stationary assembly 42. The number of guide pin passages 68 are disposed in a pattern corresponding to the guide pin passages 36 of the recess 34 of the mounting assembly body 18 previously discussed. Each guide pin passage 68 has a cross-sectional area structured to accommodate a guide bushing 69. The number of guide pin passages 36 of the recess 34 and the number of guide pin passages 68 of the planar member 60, along with the associated guide bushings 37 and 69 thereof, are structured to position each forming assembly 16 relative to the cam 330. That is, in an embodiment including the guide pin passages 36, 68, when a planar member 60 is disposed in a machined recess 34, each guide pin passage 36 generally aligns with an associated guide pin passage 68. Further, when guide pins 39 are passed through the associated guide pin passages 36, 68 (and the associated bushings 37, 69), the planar member 60 is brought into alignment with the cam 330. Although two sets of associated guide pin passages 36 and 68 are shown, it is to be appreciated that the quantity of associated guide pin passages 36 and 68 may be varied without varying from the scope of the disclosed concept.

The supports 62 of the base 50 include at least a domer support 70. The domer support 70 includes a generally planar body 72 that may be a separate member coupled to the planar member 60, or may be formed unitarily with the planar member 60. As shown, the body 72 of the domer support 70 extends generally laterally relative to a longitudinal axis L of a ram body 122, discussed below. The supports 62 of the base 50 further include a die pack support 74 which, as shown, is a frame 76 that is raised above the plane of the planar member 60 of the base 50 of the forming assembly 16. Further, the supports 62 of the base 50 include a ram guide assembly support 78 that is structured to, and does, support the ram guide assembly 52 of the stationary assembly 42. As shown, the ram guide assembly support 78 includes a generally planar body 79 that may be a separate member coupled to the planar member 60, or may be formed unitary with the planar member 60. The body 79 extends generally parallel to the plane of the body 72 of the domer support 70.

Continuing to refer to FIG. 4, as well as to FIG. 7B, the ram guide assembly 52 includes a housing 80 defining a passage 81. A number of bearing assemblies 82 such as, but not limited to, hydrostatic/hydrodynamic bearing assemblies 84 (which also define a passage, not numbered) are disposed in the housing 80. The bearing assemblies 84 are structured to, and do, support the ram body 122 as the ram body 122 reciprocates, as described below. The ram guide assembly 52 further includes a seal pack assembly 86 (FIG. 4) that is structured to, and does, substantially remove the hydrostatic/hydrodynamic bearing fluid from the ram body 122 (discussed below), as is known.

As shown in FIG. 4 and FIGS. 8A-8C, the redraw assembly 200 includes both stationary elements and moving elements and is included herein with the stationary assembly 42 of the forming assembly 16. In an exemplary embodiment, the redraw assembly 200 includes a hold down piston 202 (shown schematically) and a blank (cup) holder 204. The blank holder 204 is coupled, directly coupled, or fixed to the hold down piston 202 and moves therewith. The hold down piston 202 and the blank holder 204 each include a generally toroid body 206, 208, respectively, each defining a central passage (not numbered) that is sized to allow a ram body 122 to pass therethrough. The redraw assembly 200 also includes a servo-motor 209, or similar construct, that is structured to move the hold down piston 202, and therefore the blank holder 204, in a generally reciprocal motion. That is, the hold down piston 202 and the blank holder 204 are structured to move/translate in a linear fashion (e.g., along a translation axis 229) between a first positioning, wherein the hold down piston 202 and the blank holder 204 are spaced from the die pack 56, and, a second positioning wherein the hold down piston 202 and blank holder 204 are disposed immediately adjacent the die pack 56. As is known, a cup feed assembly 108 (discussed below) or similar construct, positions a cup or blank at the mouth of the die pack 56. The blank holder 204 maintains the cup/blank in this position until the ram body 122 engages the cup/blank and moves the cup/blank through the die pack 56.

In an exemplary embodiment, such as illustrated in FIG. 4 and FIGS. 8A-8C, a servo-motor 209 is coupled to a number of cam disks 214, 214' (two are shown in the illustrated example, further, it is noted that the cam 330 of the ram drive assembly 300, discussed below, is identified as the "cam 330"; while, as used herein, the "cam disk 214" is identified as the "cam disk 214") and the hold down piston 202 and the blank holder 204 are coupled to, or biased against (i.e., away from the die pack 56) the cam disk 214 via a number of suitable biasing members 210 (e.g., spring(s) or other suitable arrangement(s)).

In the exemplary embodiment shown in FIG. 4, the cam disk 214 is a generally planar body that is rotatable about a rotation axis 215 (disposed perpendicular to the aforementioned translation axis 229 of the hold down piston 202 and the blank holder 204) by the servo motor 209. The hold down piston 202 and the blank holder 204 are biased against the edge surface 211 of the cam disk 214. The edge surface 211 of the cam disk 214 defines a forward stroke portion 216, a forward dwell portion 218, a backward stroke portion 220 and a backward dwell portion 222. That is, as the forward stroke portion 216 engages the hold down piston 202, the hold down piston 202, and therefore the blank holder 204, moves from the first position to the second position (i.e., toward the die pack 56), compressing the number of biasing members 210. As the forward dwell portion 218 engages the hold down piston 202, the hold down piston 202, and therefore the blank holder 204, are maintained in the second position. As the backward stroke portion 220 engages the hold down piston 202, the hold down piston 202, and therefore the blank holder 204, move from the second position to the first position (i.e., away from the die pack 56) due to the force of the number of biasing members 210. As the backward dwell portion 222 engages the hold down piston 202, the hold down piston 202, and therefore the blank holder 204, are maintained in the first position. Thus, the hold down piston 202, and therefore the blank holder 204 moves between the first and second positions while dwelling at those positions between periods of motion. This allows a cup/blank to be positioned between the blank holder 204 and the die pack 56 while the blank holder 204 dwells at the first position, and, allows the blank holder 204 to maintain a cup/blank at the die pack 56 while the blank holder 204 dwells at the second position. In another embodiment, not shown, the ram drive assembly 300 includes a linkage that moves the hold down piston 202 and the blank holder 204 between the first and second positions in a similar manner, i.e., moving with dwell periods in between motion periods, thus eliminating the cam disk 214.

Figure 9A:
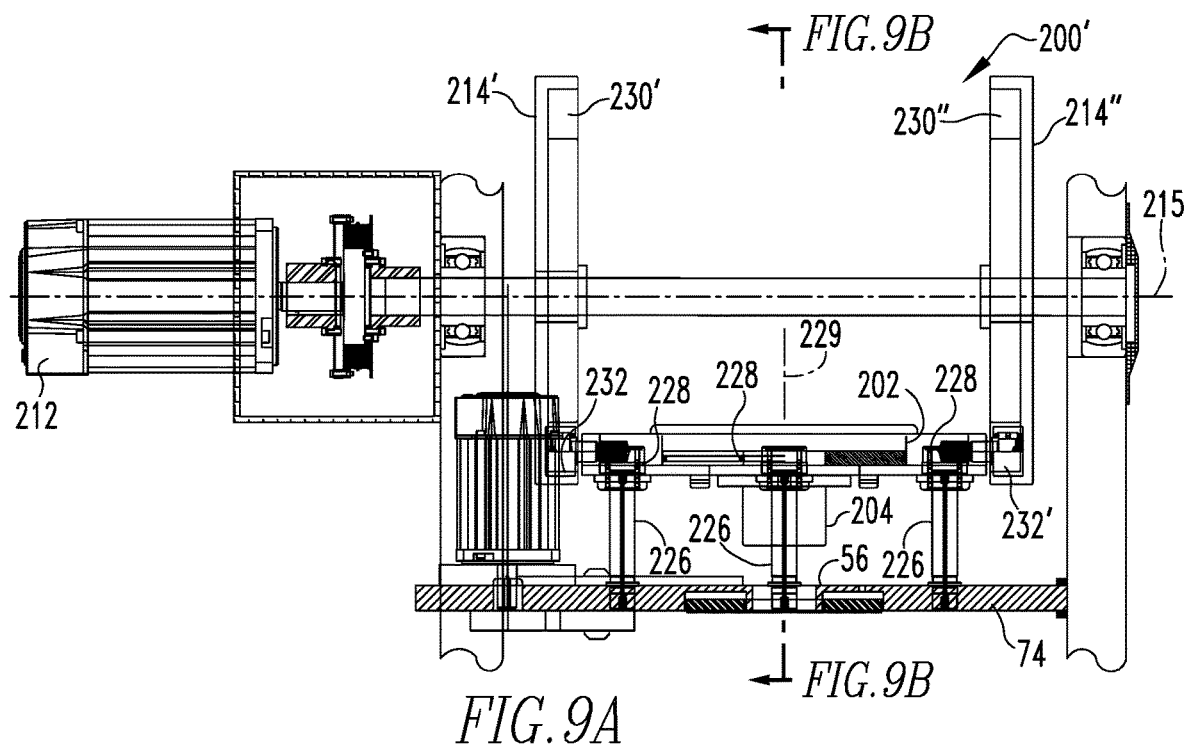
FIG. 9A is a schematic top view of a redraw assembly in accordance with one example embodiment of the disclosed concept.
Figure 9B:
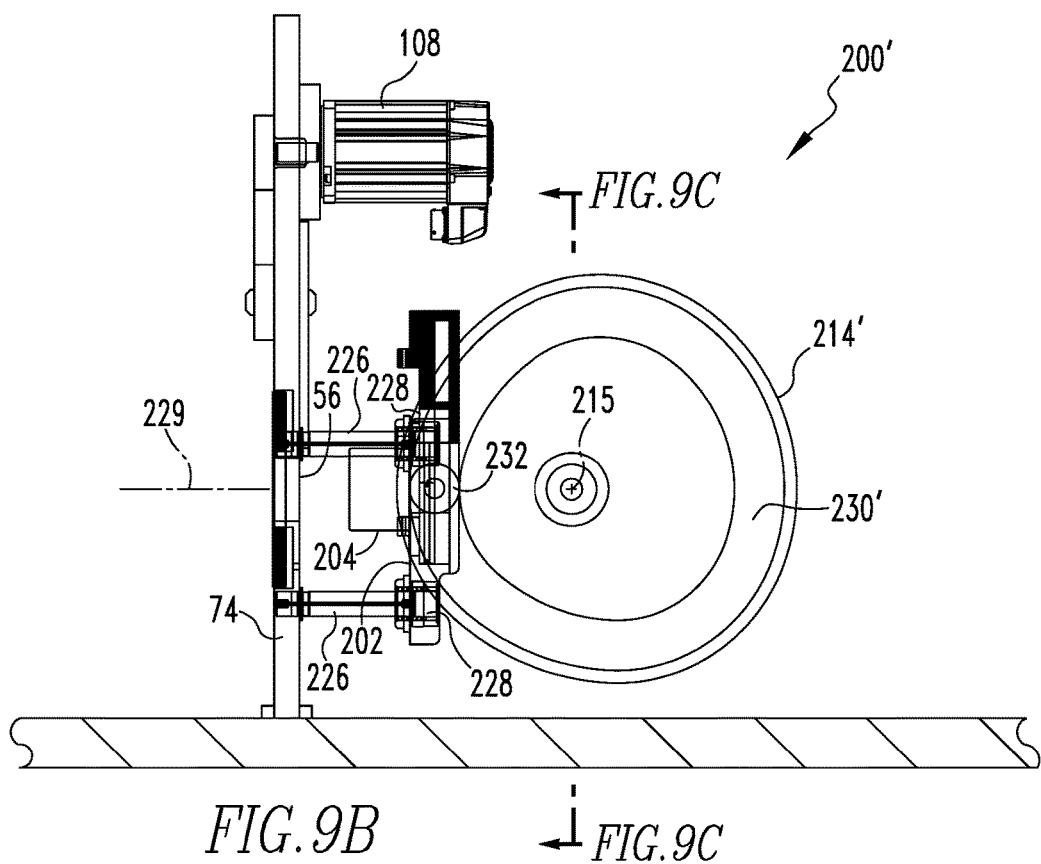
FIG. 9B is a schematic sectional view of the redraw assembly of FIG. 9A as indicated in FIG. 9A.
Figure 9C:
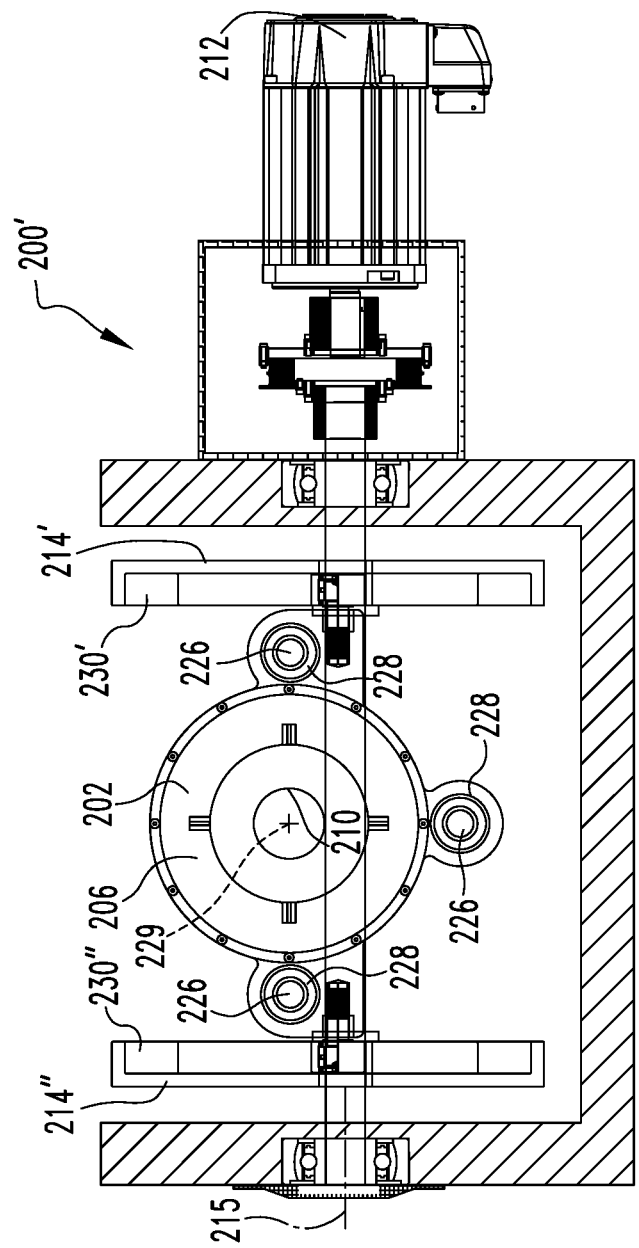
FIG. 9C is a schematic sectional view of the redraw assembly of FIGS. 9A and 9B as indicated in FIG. 9B.

FIGS. 9A-9C show another exemplary embodiment of a redraw assembly 200' including a hold down piston 202 and blank holder 204 similar to redraw assembly 200. The hold down piston 202 and blank holder 204 are slidably coupled to the die pack support 74 (e.g., via a number of linear bearing pins 226 and cooperating linear bearing bushings 228) such that the hold down piston 202 and blank holder 204 are readily translatable along a translation axis 229 disposed perpendicular to the rotation axis 215. Redraw assembly 200' functions similarly to the redraw assembly 200 of FIG. 4 except the redraw assembly 200' utilizes a cam disk 214' having a groove 230' that is engaged by a roller member 232 or other suitable construct that is coupled to the hold down piston 202. Optionally, redraw assembly 200' further utilizes a second cam disk 214" having a groove 230" that is likewise engaged by a second roller member 232'. In operation, one or both of cam disks 214' and 214" are rotated about the rotation axis 215 by a servo-motor 212, or similar construct that is directly coupled the servo motor 212 (as shown) or coupled thereto via a belt or other suitable arrangement. As one or both of cam disks 214' and 214" are rotated, the grooves 230' and 230" thereof interact with the roller members 230 and 232, thus causing the hold down piston 202 and the blank holder 204 to translate back and forth along the translation axis 229 among a first positioning, wherein the hold down piston 202 and the blank holder 204 are spaced from the die pack 56, and a second positioning, wherein the hold down piston 202 and the blank holder 204 are disposed immediately adjacent the die pack 56.

Moving on to the die pack 56, the die pack 56 includes a number, and typically a plurality, of dies (none numbered). Each die includes a generally toroid body (none shown) having a central opening sized to iron and otherwise form the cup/blank into a can body (not shown). That is, as is well known, the die pack 56 is structured to reform/form a cup/blank disposed on a punch 124/ram body 122 into a can body (discussed below). As such, the dies of the die pack 56 define a forming passage 100 having an upstream, proximal end 102 (or "mouth" 102) and a downstream, distal end 104.

The redraw assembly 200 is disposed at the proximal end 102 of the forming passage 100. Further, and as is known, the die pack 56 includes, or is disposed adjacent or immediately adjacent, a stripper assembly 106 structured to strip, i.e., remove, a can body from the ram body 122 during the return stroke, as described below. That is, the stripper assembly 106 is disposed at the distal end of the forming passage 100.

In an exemplary embodiment, the die pack 56 further includes a cup (or blank) feed assembly 108. In an exemplary embodiment, the cup feed assembly 108 includes a servo-motor and a rotary support (neither numbered). Cups, or blanks, are disposed on the cup feed assembly rotary support. The cup feed assembly servo-motor is structured to, and does, rotate the cup feed assembly rotary support so that a cup (or blank) is positioned at the proximal end 102 of the forming passage 100 of the die pack 56 prior to the ram body 122 moving through the die pack 56, as discussed below.

The domer 58 includes a mounting assembly 110 and a domer body 112. The mounting assembly 110 is structured to be coupled to the domer support 70. The mounting assembly 110 is further structured to adjustably support the domer body 112. The domer body 112 includes a domed surface 114 having a vertex 116. The domed surface 114/vertex 116 is disposed facing, and generally aligned with, the forming passage 100 of the die pack 56, as is known.

Figure 5:
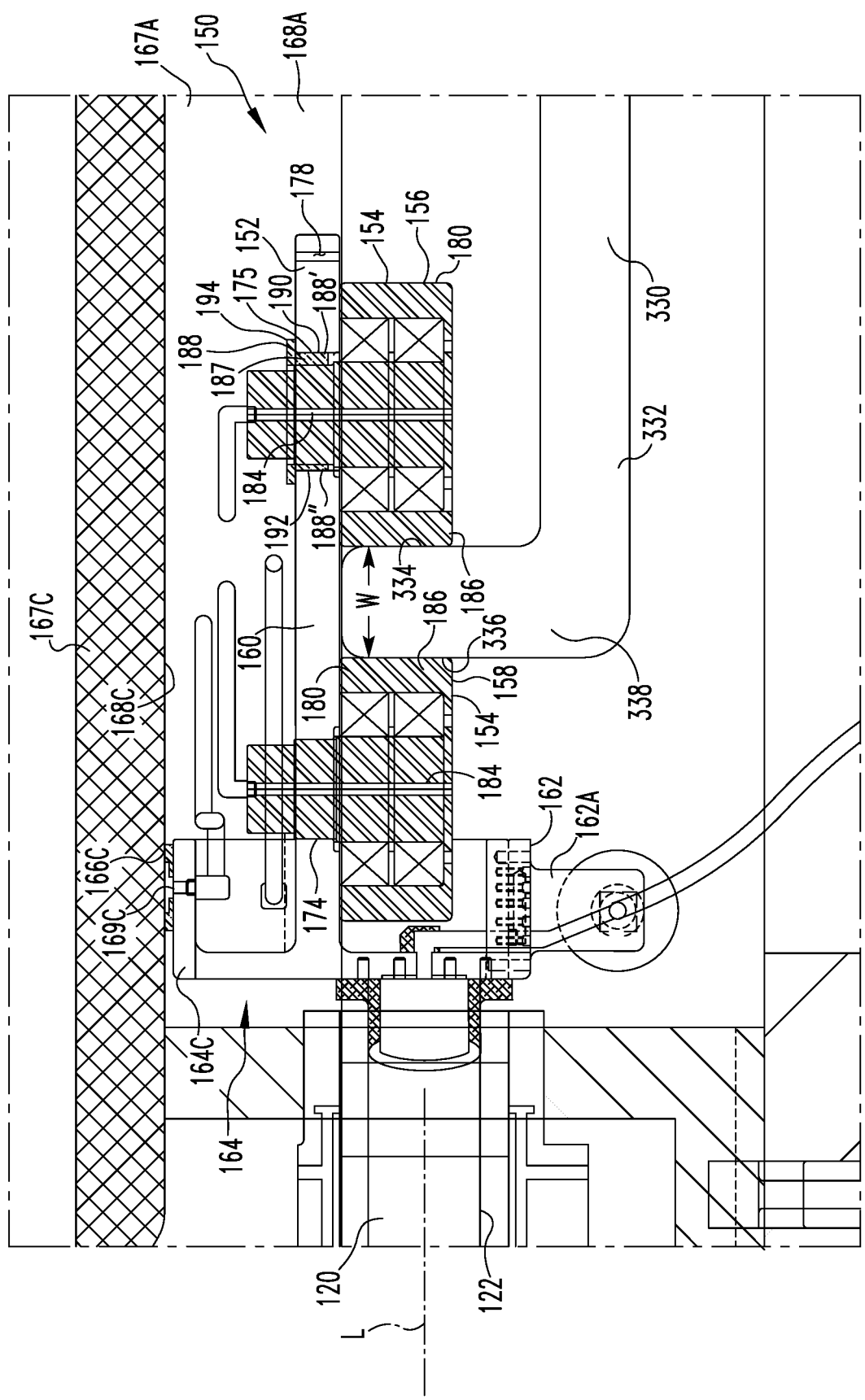
FIG. 5 is a schematic detail cross-sectional side elevation view of a cam follower of the bodymaker of FIGS. 2-4 as indicated in FIG. 4.
Figure 6:
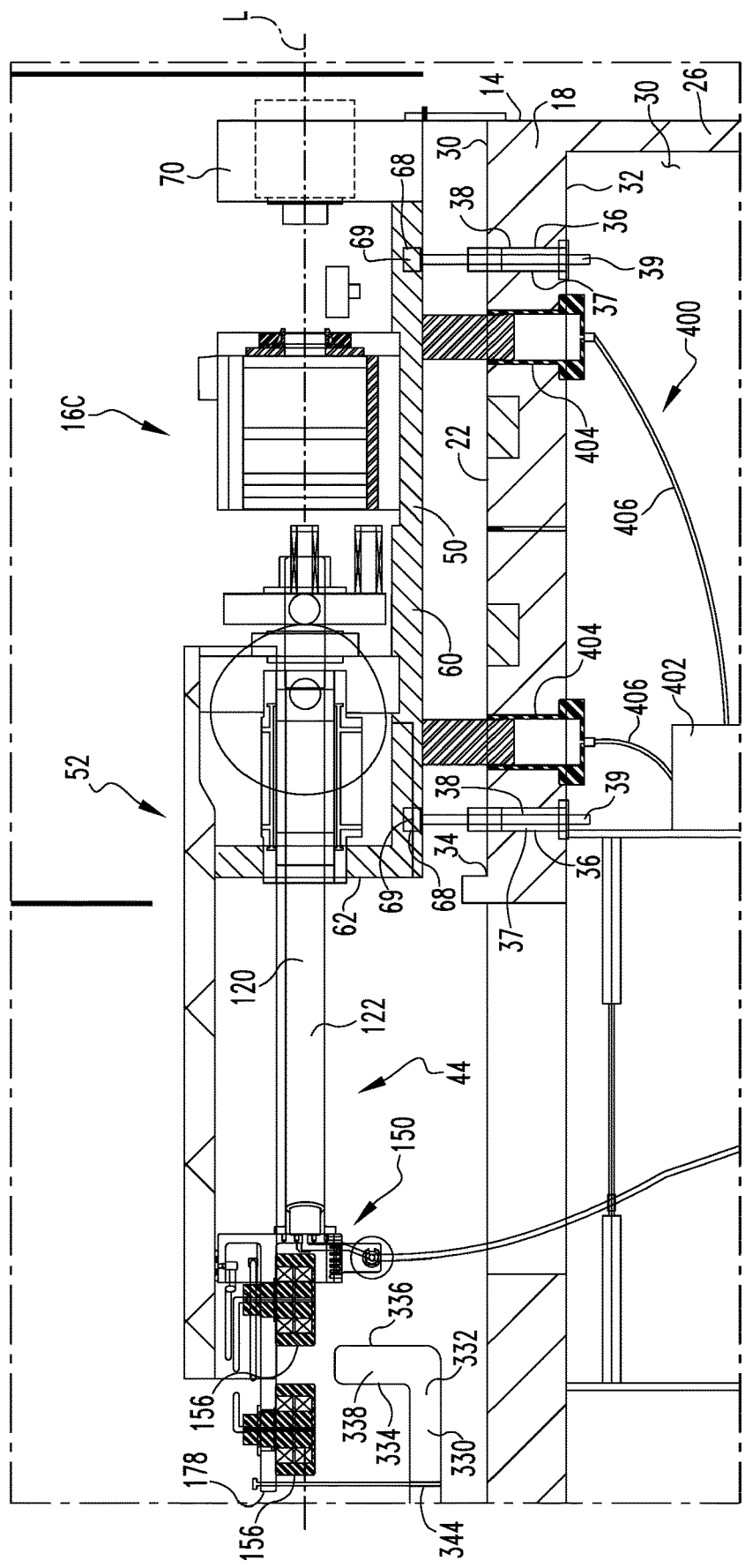
FIG. 6 is a schematic detail cross-sectional side elevation view of another forming assembly of the bodymaker of FIGS. 2 and 3, as indicated in FIG. 3, shown in a non-operational disengaged position from the disk cam.
Figure 8A:
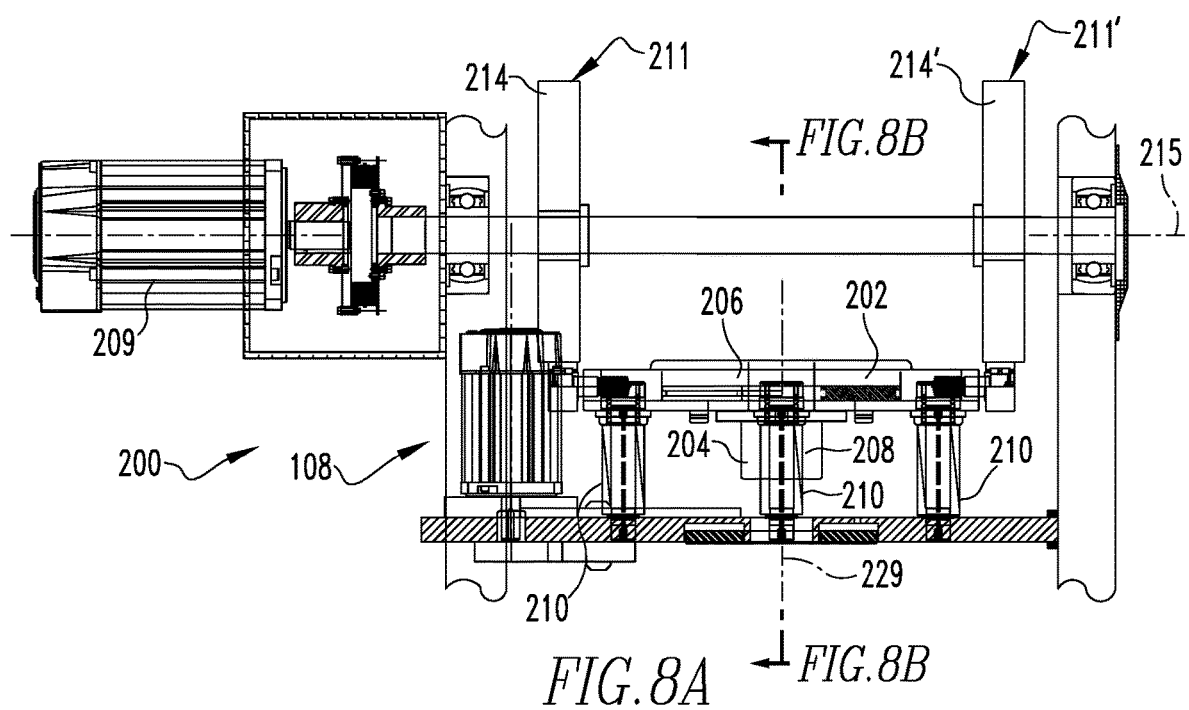
FIG. 8A is a schematic top view of a redraw assembly in accordance with one example embodiment of the disclosed concept.
Figure 8B:
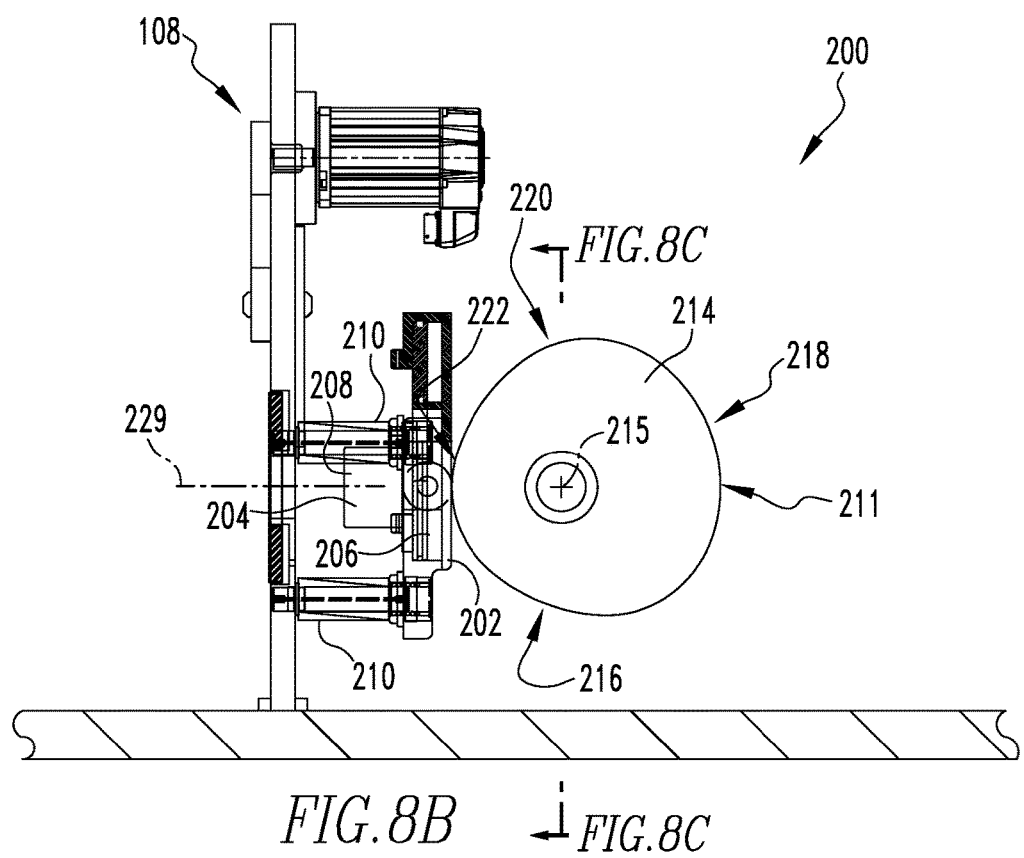
FIG. 8B is a schematic sectional view of the redraw assembly of FIG. 8A as indicated in FIG. 8A.
Figure 8C:
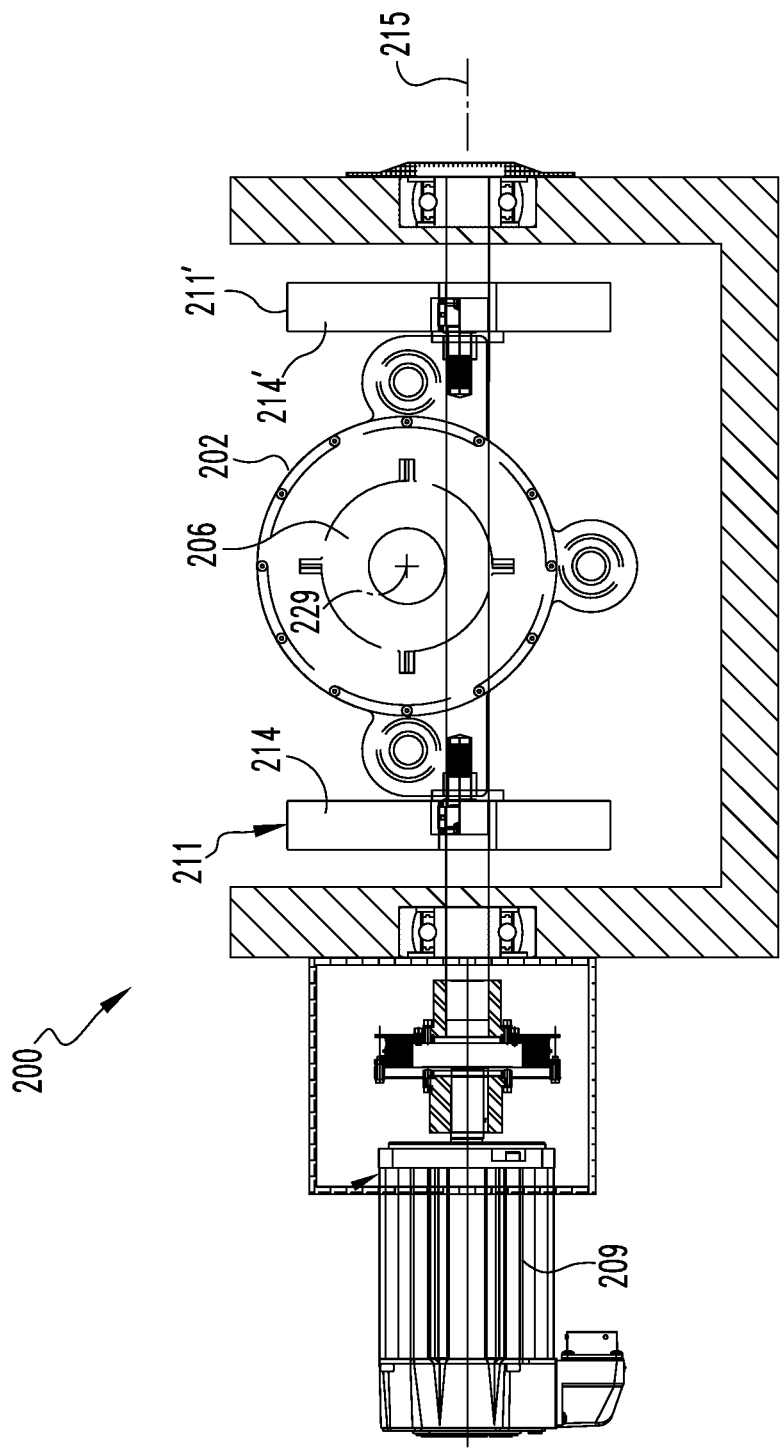
FIG. 8C is a schematic sectional view of the redraw assembly of FIGS. 8A and 8B as indicated in FIG. 8B.

Referring to FIGS. 4-6, the moving assembly 44 of the forming assembly 16 includes a ram assembly 120 and a cam follower assembly 150. The ram assembly 120 includes an elongated body 122 (hereinafter, and as used herein, "ram body" 122) and a punch 124 (hereinafter, and as used herein, "punch" 124). The ram body 122 has a proximal, or first, end 126, a medial portion 125 and a distal, or second, end 128. As is known, the punch 124 is coupled, directly coupled, or fixed to the ram body distal end 128. As is known, the distal end 128 has a smaller cross-sectional area relative to the proximal end 126 and the medial portion 125. In an exemplary embodiment, the punch 124 has a cross-sectional area that is substantially similar to the proximal end 126 and the medial portion 125. Thus, there is a generally, or a substantially, smooth transition between the punch 124 and the ram body 122. The cam follower assembly 150 is disposed at, and coupled to, the proximal end 126 of the ram body 122.

Further, in an exemplary embodiment, the ram body 122 is generally hollow. That is, the ram body 122 defines a cavity 130. The distal end 128 of the ram body 122 includes a passage 129 that is in fluid communication with the cavity 130. Further, if a punch 124 is used, the punch 124 also includes an axially extending passage 127. That is, the passage 129 of the ram body 122 (and, if included, the punch passage 127) extends from the axial surface of the distal end 128 of the ram body 122 to the cavity 130. The cavity 130 is selectively in fluid communication with a pressure assembly (discussed below). The pressure assembly is structured to, and does, generate a positive and/or a negative fluid pressure. As is known, the cavity 130 of the ram body 122 is selectively in fluid communication with a negative fluid pressure when the ram body 122 is moving forward (i.e., away from the ram drive assembly 300). In this configuration, a negative fluid pressure biases the cup/blank toward the ram body 122 and/or punch 124. When the ram body 122 is moving backward (i.e., toward the ram drive assembly 300), a positive pressure helps to remove the now formed can body from the ram body 122/punch 124. As the ram body 122 is one of the longer elements of the forming assembly 16, as used herein, the longitudinal axis L of the ram body 122 is also the longitudinal axis of the forming assembly 16.

Referring to FIGS. 4, 5 and 7A-7D, the cam follower assembly 150 of the moving assembly 44 of a forming assembly 16 includes a slider 152 and a number of cam follower members 154 (two are shown in the example). In an exemplary embodiment, the slider 152 includes a slider body 160, a lower frame portion 162 extending downward from the slider body 160, and an upper frame portion 164 extending upward from the slider body 160. In the example illustrated, slider body 160 is disposed generally parallel to the plane of the first surface 22 of the mounting assembly body 18, i.e., generally horizontally as shown.

The lower frame portion 162 of the slider body 160 includes a first member 162A extending downward generally from at or near a first edge 160A of slider body 16, a second member 162B extending downward generally from at or near a second edge 160B of slider body 160 opposite the first edge 160A, and a third member 162C extending between the first and second members 162A and 162B and spaced a distance below slider body 160. In the example shown in FIG. 7D, the third member 162C extends generally horizontally, parallel to the slider body 160, between first and second members 162A and 162B. Each of the first, second, and third members 162A-162C may be formed integrally as portions of a single unitary member, such as shown in the example of FIG. 7D, or alternatively may be formed as separately and then coupled together via any suitable method (e.g., bolts, welding, etc.).

The upper frame portion 164 of the slider body 160 includes a first member 164A extending upward generally from at or near the first edge 160A of slider body 160, a second member 164B extending upward generally from at or near the second edge 160B of slider body 160, and a third member 164C extending between the first and second members 164A and 164B and spaced a distance above slider body 160. Each of the first, second, and third members 164A-164C may be formed integrally as portions of a single unitary member, such as shown in the example of FIG. 7D, or alternatively may be formed as separately and then coupled together via any suitable method (e.g., bolts, welding, etc.).

Continuing to refer to FIGS. 7A and 7D, the cam follower assembly 150 further includes a cam follower bearing assembly 165 having a number of hydrostatic/hydrodynamic bearing pads 166 which are positioned and structured to engage with corresponding, cooperatively positioned, bearing members 167 provided as part(s) of stationary assembly 42. Each bearing member 167 includes a bearing surface 168 upon which each bearing pad 166 is positioned and structured to slide. A hydrostatic/hydrodynamic bearing assembly is discussed in detail in U.S. Pat. No. 10,137,490 and the disclosure of the hydrostatic/hydrodynamic bearing assembly therein is incorporated herein by reference. Each bearing pad 166 includes a recessed bearing pocket 169 (two of which, 169A and 169C, are numbered in FIG. 7D) that is structured to generally house a pressurized supply of oil or other suitable bearing fluid (not shown) provided therein (as discussed further below).

Prior art drive assemblies, such as drive assembly 2 previously discussed in regard to FIG. 1 exert vertical forces on ram bodies, such as ram body 7B, that must be addressed/managed by bearings that generally completely surround the ram body. Such vertical forces can result in ram "droop" However, unlike such prior art arrangements, arrangements utilizing a cam drive such as described herein are generally only subjected to moderate lateral forces and are not subjected to any meaningful vertical forces. Hence, the cam follower bearing assembly 165 is of unique design as compared to known arrangements. In the example illustrated in FIGS. 7A-7D, the cam follower bearing assembly 165 includes three generally planar hydrostatic/hydrodynamic bearing pads 166: a first bearing pad 166A coupled, directly coupled, or fixed to an outward facing face of first member 164A; a second bearing pad 166B coupled, directly coupled, or fixed to an outward facing face of second member 164B (i.e., facing in the opposite direction from first bearing pad 166A); and a third bearing pad 166C coupled, directly coupled, or fixed to an upward facing face of third member 164C. In such example, the cam follower bearing assembly 165 also includes three bearing members 167A, 167B and 167C, respectively having bearing surfaces 168A, 168B and 168C. More particularly, the first bearing member 167A is fixedly coupled to the stationary assembly base 50 of the forming assembly 16 such that the bearing surface 168A thereof is positioned outward, above, and parallel to the longitudinal axis L of the ram body 122 of the forming assembly 16, and generally perpendicular to the stationary assembly base 50. The second bearing member 167B is fixedly coupled to the stationary assembly base 50 of the forming assembly 16 such that the bearing surface 168B thereof is positioned outward, above, and parallel to the longitudinal axis L of the ram body 122 of the forming assembly 16; generally perpendicular to the stationary assembly base 50, and facing the bearing surface 168A of the first bearing member 167A. The third bearing member 167C is fixedly coupled to the stationary assembly base 50 of the forming assembly 16 such that the bearing surface 168C thereof is positioned directly above and parallel to the longitudinal axis L of the ram body 122 of the forming assembly 16, generally parallel to the stationary assembly base 50, and perpendicular to each of the bearing surfaces 168A and 168B of the first bearing member 167A and the second bearing member 167B. Accordingly, as can be readily appreciated from the sectional view of FIG. 7C, the three bearing members 167A-167C are positioned so as to form a downward opening channel (with the bearing surfaces 168A-168C facing inward) that is disposed about the upper frame portion 164 of the slider body 160 and the outward facing bearings pads 166A-166C thereof. From such view, it can also be readily appreciated that such cam follower bearing assembly 165 does not include any bearing members 167 or surfaces 168 providing upward support to slider 152, as none are needed in such arrangement as compared to prior art arrangements. In one exemplary embodiment in accordance with the disclosed concept, each of the bearing surfaces 168A-168C are ground to a 4-8 micron surface finish and parallelism and squareness within 0.0002".

As previously discussed, the ram body 122 is generally hollow and defines the cavity 130 therein that is selectively in fluid communication with a pressure assembly. Such communication between a pressure assembly (not shown) and cavity 130 of ram body 122 is provided via a flexible conduit or hose 170 that extends between a lower rotary seal 170A that is coupled to mounting assembly body 18 or any other suitable fixed location for connection to the aforementioned pressure assembly, and an upper rotary seal 170B that is coupled to the lower frame portion 162 of the slider body 160. The upper rotary seal 170B is in fluid communication with the cavity 130 of the ram body via any suitable conduit arrangement provided as a part of cam follower assembly 150. A shock absorber arrangement 171 is provided about hose 170 to minimize hose whipping resulting from the reciprocating movement of cam follower assembly 150.

As also previously discussed, each bearing pad 166 includes a recessed bearing pocket 169 that is structured to generally house a pressurized supply of oil or other suitable bearing fluid (not shown) provided therein. Such supply of oil or other suitable bearing fluid is provided in a similar manner as the conductive pressure arrangement just described. In other words, the supply of oil or other suitable bearing fluid is provided to a second upper rotary seal 172B (see FIGS. 7B and 7C) that is coupled to the lower frame portion 162 of the slider body 160. The supply is provided via a hose coupled to a second lower rotary seal (neither of which are shown) positioned similarly to hose and lower rotary seal 170 and 170A (and shock absorber arrangement 171) that is coupled to a suitable source of the supply (also not shown). The supply of oil or other suitable bearing fluid is communicated from the second upper rotary seal 172B to the recessed bearing pocket 169 of each of the number of bearing pads 166A, 166B, 166C via any suitable conduit arrangement provided as a part of cam follower assembly 150 connected to an inlet 173 (see FIG. 7D) provided in each bearing pocket 169. In one exemplary embodiment in accordance with the disclosed concept, an oil flow is injected into a manifold (not numbered) at a pressure of approximately 1000 psi. From the aforementioned manifold the oil flow is fed to each bearing pad 166A, 166B, 166C. The oil flow is controlled by leejets (i.e., calibrated orifices). It is to be appreciated that such arrangement of bearing pads 166A, 166B, 166C, corresponding bearing surfaces 168A, 168B, 168C, and oil flow results in an oil film between the corresponding bearing pads 166A, 166B, 166C and bearing surfaces 168A, 168B, 168C that prevents any metal to metal contact and thus provides for smooth sliding of cam follower assembly 150 along bearing members 167A, 167B, 167C and thus smooth translations relative to the stationary assembly base 50 of the forming assembly 16.

Referring now to FIG. 5, the slider body 160 includes a number of passages (not collectively numbered) defined therethrough. The passages include a number of cam follower mounting passages, two shown 174 and 175. If there are two cam follower mounting passages 174, 175, the cam follower mounting passages 174, 175 are disposed generally along a line that, when the forming assembly 16 is coupled to the mounting assembly 14, is generally a radial line extending outward from the passage 20 of the mounting assembly body 18 and aligned above the longitudinal axis L of the ram body 122 of forming assembly 16. Another passage defined through slider body 160 is an alignment pin passage 178 positioned generally adjacent the end of slider body 160 opposite ram body 122.

The cam follower members 154 are structured to be, and are, operatively engaged by the cam 330 of the ram drive assembly 300. Stated alternately, the cam 330 is structured to be, and is, operatively coupled to the cam follower members 154 of the moving assembly 44 of each forming assembly 16 and is, therefore, operatively coupled to each ram assembly 120 and/or forming assembly 16.

In one embodiment, not shown, the cam follower members 154 are rigid bearings. In the embodiment shown in FIGS. 2-6 and 7A-7D, the cam follower members 154 are roller bearings 180 (hereinafter, and as used herein, the "cam follower roller bearings" 180). As shown, and in an exemplary embodiment, each cam follower roller bearing includes an axle 184 and a wheel 186 (see FIG. 5). Further, and in an exemplary embodiment, one of the cam follower roller bearings 180 includes an eccentric bushing 187. The eccentric bushing 187 includes a hollow tubular body 188 that is structured to fit within cam follower mounting passage 175 (or alternatively passage 174). The tubular body 188 has a generally cylindrical outer surface 190 having a first center (not numbered), and, a generally cylindrical outer surface 192 having a second center (not numbered). The first and second centers noted in the prior sentence are not aligned. That is, the first and second centers noted above are offset from each other. In this configuration, the eccentric bushing 187 includes a portion with a maximum thickness, hereinafter the "thicker" side 188' of the eccentric bushing 187, and, a portion with a minimum thickness, hereinafter the "thinner" side 188" of the eccentric bushing 187. Further, the eccentric bushing 187 includes an orientation tab 194 that extends generally radially from the outer surface 190 of the tubular body 188. In this configuration, the eccentric bushing 187 is structured to, and does, move the associated roller bearing wheel 186 between a spaced, first position and a close, second position, as discussed below.

Thus, as used herein, a "forming assembly" 16 includes at least a die pack 56, a domer 58, and a ram body 122. Further, a "forming assembly" 16 selectively includes additional elements such as, but not limited to, a ram guide assembly 52 and a redraw assembly 200.

A forming assembly 16 is assembled as follows. The ram guide assembly 52, the redraw assembly 200, and the die pack 56 are coupled, directly coupled, or fixed to the base planar member 60, i.e., the stationary assembly base 50. The domer 58 is coupled, directly coupled, or fixed to the domer support 70, i.e., which, as previously discussed, is coupled to, or formed as a unitary portion of, the stationary assembly base 50. Generally, the ram guide assembly 52 is disposed closest to the passage 20 of the mounting assembly body 18. The redraw assembly 200 is disposed adjacent the ram guide assembly 52. The die pack 56 is disposed adjacent the ram guide assembly 52 with the cup feed assembly 108 disposed between the redraw assembly 200 and the die pack 56. Further, as noted above, the stripper assembly 106 is disposed at the distal end 104 of the forming passage 100 of the die pack 56. Finally, the domer 58 is spaced from the die pack 56 and/or stripper assembly 106. That is, the domer 58 (or stripper assembly 106) is spaced from the die pack 56 by a distance that is at least the length of a can body and, as shown, a distance that is greater than at least the length of a can body. In one embodiment, and in the configuration described above, the stationary assembly 42 of the forming assembly 16 is complete.

The moving assembly 44 of the forming assembly 16 is assembled as follows. The proximal end 126 of the ram body 122 is coupled, directly coupled, or fixed to the slider 152 of the cam follower assembly 150. As shown, and in an exemplary embodiment, the proximal end 126 of the ram body 122 is coupled to the lower frame portion 162 of the slider body 160. The punch 124 is disposed over and coupled, directly coupled, or fixed to the distal end 128 of the ram body 122. In this configuration, the longitudinal axis L of the ram body 122 is generally, or substantially, aligned with the longitudinal axis of the passage 81, the redraw assembly 200, and the forming passage 100 of the die pack 56. Further, the longitudinal axis L of the ram body 122 is generally, or substantially, aligned with the vertex 116 of the domed surface 114 of the domer body 112. That is, if the longitudinal axis L of the ram body 122 were extended, it would pass through, or be immediately adjacent the vertex 116 of the domed surface 114 of the domer body 112.

In this configuration, and in one embodiment, the forming assembly 16 is complete. Further, as noted above, the forming assembly 16 is a "unified" assembly. Further, it is understood that as the forming assembly 16 is assembled, the various elements are positioned to be in proper alignment, as is known in the art. That is, for example, the ram body 122 is adjusted/repositioned until the longitudinal axis L of the ram body 122 is generally, or substantially, aligned with the longitudinal axis of the passage 81 of the housing 80 of the ram guide assembly 52 and the longitudinal axis of the forming passage 100 of the die pack 56. As the forming assembly 16 is a "unified" assembly, the elements thereof remain aligned with each other. That is, when the forming assembly 16 is removed from the mounting assembly 14, the elements thereof are not separated. As such, the elements of the forming assembly 16 do not have to be adjusted so as to be in alignment each time the forming assembly 16 is installed. A forming assembly 16 that maintains the alignment of the elements, i.e., wherein the elements of the stationary assembly 42 and the moving assembly 44 are not separated, during an installation is, as used herein, an "aligned" unified forming assembly 16. A unified forming assembly 16 or an aligned unified forming assembly 16 solves the problem(s) noted above.

As shown in FIGS. 2-3, the ram drive assembly 300 of bodymaker 10 is structured to, and does, move the moving assembly 44 of the forming assembly 16, i.e., the ram assembly 120 or the ram body 122, between a retracted (i.e., toward the ram drive assembly 300), first position, wherein the ram body 122 is not disposed in the forming passage 100 and the distal end 128 of the ram body 122 is spaced from an associated die pack 56, and, an extended (i.e., away from the ram drive assembly 300), second position wherein the ram body 122 is disposed in the forming passage 100 and the distal end 128 of the ram body 122 is adjacent an associated domer 58. The ram drive assembly 300, as detailed below, does not include either a crank, a swing arm, and/or pivoting connecting rods. This solves the problem(s) noted above.

Referring to FIG. 3, the ram drive assembly 300 includes a motor 310 and a cam 330 that is rotated around a prime axis of rotation 330 by the motor 310. The motor 310 includes a rotating output shaft 312. In an exemplary embodiment, the motor 310 is disposed below the mounting assembly body 18 within the enclosed space 30 defined by housing 28. As shown, a primary axle 314 is generally disposed within the hollow mounting assembly enclosed space 30 and rotatable about prime axis 333. The motor output shaft 312 is operatively coupled to the primary axle 314, e.g., by a gear box 315. As such, the primary axle 314 is also identified herein as a part of the motor 310. The primary axle 314 includes an elongated axle body 316 having an upper, first end 318 and a lower, second end (not numbered) coupled to the gear box 315. The lower second end of axle body 316 may be selectively coupled to the gear box 315 via a suitable clutch arrangement that provides for axle body 316 to be selectively engaged or disengaged from the gear box 315, and thus motor 310. The first end 318 of the axle body 316 extends through the passage 20 of the mounting assembly body 18. The first end 318 of the axle body 316 is structured to be, and is, coupled to the cam body 332. A brake arrangement 319 (e.g., a disk brake or other suitable arrangement) is positioned along primary axle 314 for selectively bringing rotation about prime axis 333 of primary axle 314 and cam body 332 to a controlled and timely stop.

The cam 330 of the ram drive assembly 300 includes a body 332 defining, or having, a number of cooperative cam surfaces 334, 336, (two shown) and identified herein as the inner, first cam surface 334 and the outer, second cam surface 336. The cam 330/cam body 332 is structured to, and does, impart a reciprocal motion to each forming assembly 16 and, in an exemplary embodiment, to each moving assembly 44 and/or ram assembly 120. Further it is noted that, as discussed below, the cam 330 moves while each forming assembly 16 is mounted on the mounting assembly 14. That is, the cam 330 is dynamic and each forming assembly 16 is statically mounted. Thus, the cam body 332 is a "dynamic cam body". This solves the problems noted above. Alternatively, the cam body 332 could be fixed or held in a steady state with each forming assembly 16 moving thereabout. In such arrangement, cam body 332 would be a "steady state cam body".

Further, in an exemplary embodiment, the cam 330/cam body 332 is structured to, and does, generate a "smooth ironing action" in the distal end 128 of the ram body 122/punch 124 as the ram body 122/punch 124 moves through the die pack 56. As used herein, a "smooth ironing action" means that the construct that supports the cup, which is typically the distal end 128 of the ram body 122 or punch 124, is not being accelerated or decelerated as the construct that supports the cup passes through the die pack 56. In an exemplary embodiment, the cam body 332 includes cooperative cam surfaces 334, 336, discussed below, having a substantially constant velocity cam profile, discussed below. The cam surfaces 334, 336 with a constant velocity cam profile cause the distal end 128 of the ram body 122 or punch 124 to move at a substantially constant velocity, i.e., no acceleration or deceleration, as the distal end 128 of the ram body 122 or punch 124 pass through the die pack 56. Thus, such a cam 330/cam body 332 is structured to, and does, generate a "smooth ironing action." This solves the problem(s) noted above.

Further, in an exemplary embodiment, the components (i.e., the ram assembly 120 and cam follower assembly 150) of the moving assembly 44 of the forming assembly 16 are of low mass. Use of such a low mass moving assembly 44 with a cam 330 having dwell portions (and thus zero acceleration and, consequently, zero inertial forces and deformations) at the travel extremes results in zero or essentially zero deformations in moving assembly 44 and components thereof at virtually any operating speed. Hence, once the position of ram assembly 120 is adjusted for optimum doming position, such positioning will not change with the production speed. This solves the problem(s) above.

Further, in an exemplary embodiment, the cam 330/cam body 332 is structured to be, and is, a "direct operative coupling element." As used herein, a "direct operative coupling element" means an element that is structured to be directly coupled to both the construct that generates motion and the ram assembly of a bodymaker. In the embodiment above, the construct that generates motion is the motor 310. To be "directly coupled" to a construct that generates motion, as used herein, means that an element is directly coupled to a motor output shaft or a mounting on a motor output shaft. As used herein, a "mounting" for a motor output shaft is a construct that rotates with the motor output shaft and which has a body that is disposed substantially symmetrically about the motor output shaft. That is, for example, the crank of a prior art bodymaker is, typically, "directly coupled" to a motor output shaft; the crank, however, does not have a body that is disposed substantially symmetrically about the motor output shaft; thus, as used herein, a crank is not a "mounting." Further, as used herein, the "ram assembly" means the elements that move with, and substantially parallel to, a ram body path of travel. That is, for example, in the prior art arrangement such as shown in FIG. 1, both the carriage 7A and the second connecting rod 6B both move with the ram body 7B, but the second connecting rod 6B does not move with, and substantially parallel to, the ram body 7B path of travel. Thus, the second connecting rod 6B, and similar elements, are not part of the "ram assembly." Thus, as described above, the prior art multi-element linkage, i.e., crank 4/swing arm 5/first connecting rod 6A/second connecting rod 6B, does not, and cannot, be a "direct operative coupling element." That is, such a linkage is not a single element and such a linkage is not directly coupled" to a motor output shaft. Thus, the cam 330/cam body 332 that is structured to be, and is, a "direct operative coupling element" solves the problem(s) noted above.

Figure 13:
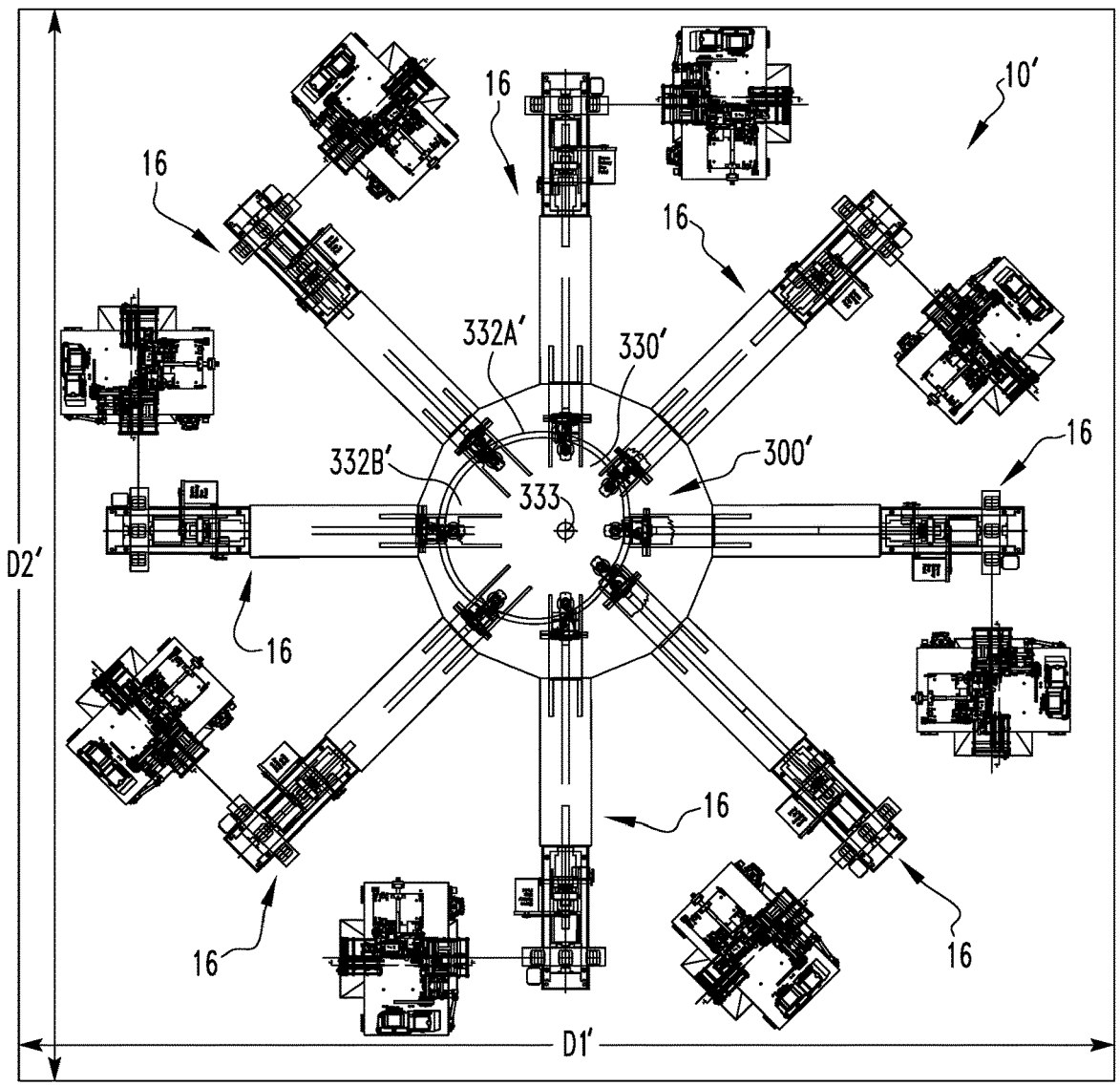
FIG. 13 is a schematic top view of a bodymaker with eight forming assemblies and related machinery in accordance with one example embodiment of the disclosed concept.

In one embodiment, the cam body 332 is a generally solid, unitary, planar with an axially extending hub 337 (FIG. 3) and a ridge 338 extending about the cam body 332 axis of rotation (i.e., prime axis 333). In another embodiment such as shown in FIG. 13, the cam body 332' is a two-part assembly, an outer ring 332A' disposed about an inner section 332B'. Outer ring 332A' and inner section 332B' may be formed from different materials and one or both of outer ring 332A' and 332B' may have one or more apertures or open sections defined therein or thereby to lighten such sections and thus reduce the moment of inertia of such cam 330'.

Referring again to FIG. 3, the cam body hub 337 defines a coupling passage 339. In an exemplary embodiment, the coupling passage 339 is tapered and narrows from bottom to top (e.g., see FIG. 3). In an exemplary embodiment, the first end 318 of the axle body 316 is structured to be, and is, coupled to the cam body 332 at the coupling passage 339. As shown, the cam body ridge 338, in an exemplary embodiment, extends about the perimeter of the cam body 332. As shown in FIG. 2, when viewed from above, the ridge 338 of the cam body 332 is not substantially circular, as discussed in detail below; that is, the ridge 338 does not have a substantially consistent radius R relative to the axis of rotation (i.e., prime axis 333) of the cam body 332, but instead is varied in a predetermined manner to create desired movement of the moving assembly 44. The overall variation in the radius R (i.e., the difference between the minimum and maximum value of the radius R, which is equal to the stroke of the ram assembly 120) is dependent on the height of the can body being produced. In an exemplary embodiment, a stroke of 22" is used to manufacture cans up to 6.5" tall/long. As used herein, a generally planar cam body 332 having a ridge 338 extending about the perimeter of the cam body 332 is a "disk cam." In this embodiment, the ridge 338 includes the inner, first cam surface 334 and the outer, second cam surface 336. Further, in an exemplary embodiment, the radial width W (FIG. 5) of the cam body ridge 338 is generally, or substantially, consistent. That is, the distance between the first cam surface 334 and the second cam surface 336 is generally, or substantially, consistent. Further, in an exemplary embodiment, the cam body 332 includes a number of alignment passages 344 disposed adjacent the cam body ridge 338, the purpose of which is discussed below.

Figure 11:
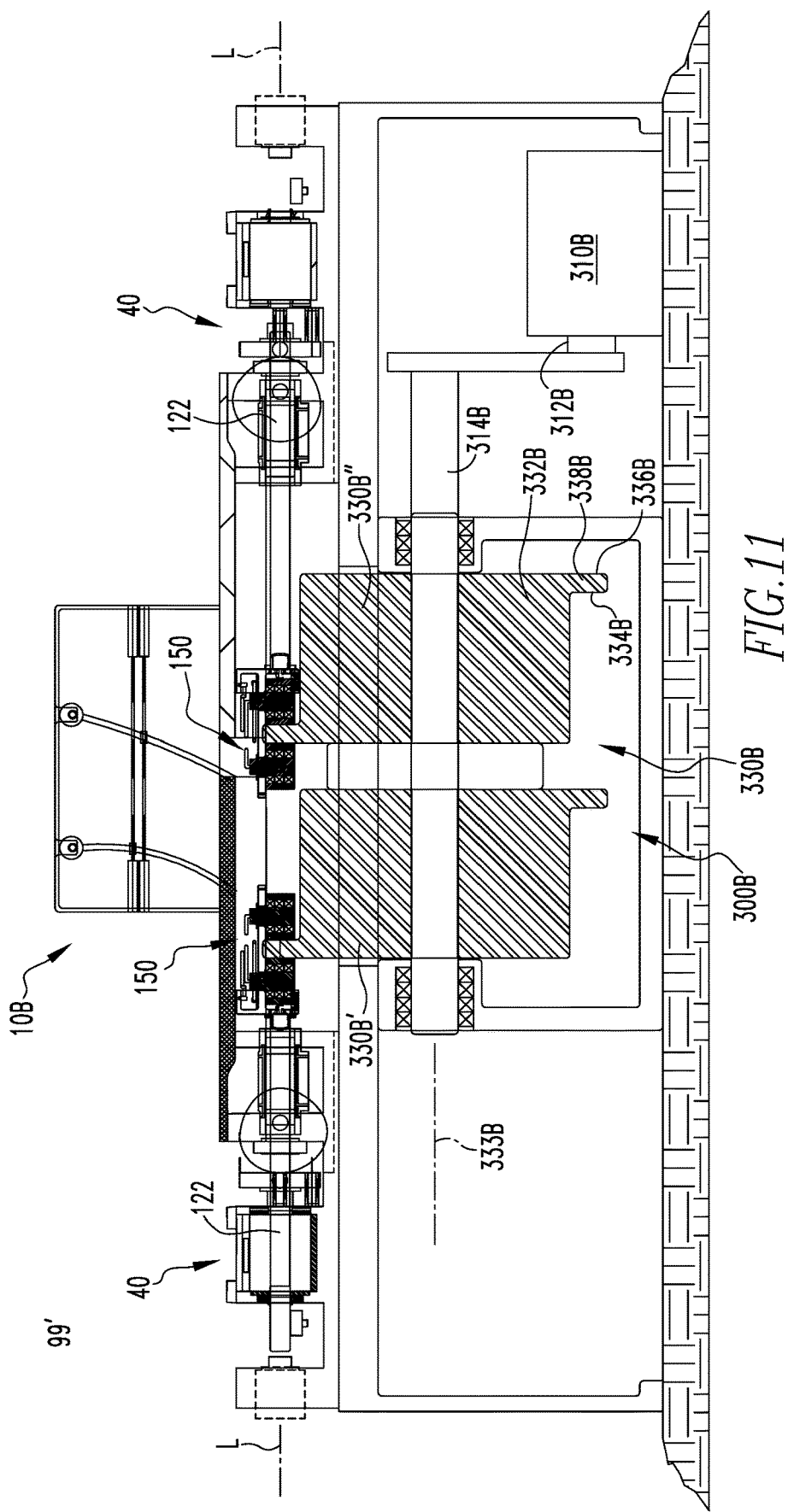
FIG. 11 is a schematic partially-sectional side elevation view of the bodymaker of FIG. 10 taken along the line indicated in FIG. 10.

In another example embodiment, such as shown in FIGS. 10 and 11, a bodymaker 10B utilizing a "barrel" cam 330B is shown. The bodymaker 10B is of a similar arrangement as the bodymaker 10 previously discussed in conjunction with FIGS. 2-6 except the bodymaker 10B only includes two forming assemblies 16 and includes a ram drive assembly 300B that includes/utilizes the "barrel" cam 330B instead of a disk cam. Hereinafter, and in relation to the barrel cam 330B, reference numbers similar to the embodiment shown in FIGS. 2-6 will be used, but the reference numbers will include the letter "B." In this embodiment, the cam body 332B is generally cylindrical and includes a groove (not shown) or a ridge (as shown) 338B disposed thereabout on a cylindrical surface (not numbered) of the cam body 332B. The ridge 338B extends generally axially while also forming a loop about the cylindrical cam body 332B. In this configuration, the cam body 332B, i.e., the ridge 338B thereon, defines a generally axial first cam surface 334B and a generally axial second cam surface 336B. It is understood that, where the ridge 338B reverses direction, the ridge 338B extends generally circumferentially around the cam body 332B rather than axially along the cam body 332B. In this embodiment, the opposing sides of the ridge 338B are the cooperative cam surfaces 334B, 336B. It is noted that a ram drive assembly 300 including, or consisting of, these elements does not include pivotal couplings. This solves the problem(s) stated above.

In either of such example arrangements, the cooperative cam surfaces 334, 336 or 334B, 336B are structured to, and do, operatively engage each cam follower assembly 150. In the embodiment shown in FIGS. 2-6, the cam follower assembly 150 includes two cam follower members 154, i.e., roller bearings 180, also identified herein as first cam follower member 156 and second cam follower member 158. The first cam follower member 156 is disposed adjacent the first cam surface 334. That is, the wheel 186 of the first cam follower member 156 is disposed adjacent to the first cam surface 334. The second cam follower member 158 is disposed adjacent the second cam surface 336. That is, the wheel 186 of the second cam follower member 158 is disposed adjacent to the second cam surface 336. Thus, in such embodiment, the first and second cam follower members 156, 158 "sandwich" the cam body ridge 338. That is, the first and second cam follower members 156, 158 are disposed on opposite sides of the cam body ridge 338. In an exemplary embodiment with a barrel cam having a groove instead of a ridge 334B, there is a single cam follower member which is structured to be, and is, disposed in the groove.

Further, as shown in FIGS. 10 and 11, in an exemplary embodiment, the bodymaker 10B has a barrel cam 330B that includes two separate barrel cams 330B', 330B" that are coupled, directly coupled, or fixed to the output shaft 312B of a motor 310B. It is understood that, in an exemplary embodiment, each barrel cam 330B', 330B" is structured to be, and is, operatively coupled to a respective forming assembly 16, such as previously discussed in regard to FIGS. 2-6. Thus, in an embodiment with a single barrel cam 330B and two forming assemblies 16, such as shown in FIGS. 10 and 11, the bodymaker 10B produces two can bodies per cycle. Although only two forming assemblies 16 are shown in FIGS. 10 and 11 being used in conjunction with barrel cam 330B, it is to be appreciated that more than two forming assemblies may be employed without varying from the scope of the present concepts. For example, additional forming assemblies 16 may be provided with the respective cam follower assemblies 150 thereof positioned to engage the 338B at generally any point around the barrel cam 330B (i.e., in addition to, or instead of only at the top as shown in FIGS. 10 and 11). As an example, when viewed generally along the prime axis of rotation 333B of barrel cam 330B, an arrangement utilizing twelve forming assemblies 150 spaced equally about the circumference of the barrel cam 330B would generally resemble the positioning of the twelve hour indicators on the face of a traditional clock.

As described above, each forming assembly 16 is coupled, directly coupled, or fixed to the mounting assembly 14. Thus, each forming assembly 16 is disposed at a fixed location adjacent the cam body 332. Further, relative to each forming assembly 16, the cam body ridge 338 moves radially outwardly and radially inwardly as the cam body 332 rotates. It is understood that as the radius of the cam body ridge 338 decreases, the first cam surface 340 operatively engages a first cam follower member 156. Conversely, when as the radius of the cam body ridge 338 increases, the second cam surface 342 operatively engages a second cam follower member 158. It is understood that as one cam surface 340, 342 operatively engages a cam follower member 156, 158, the other cam surface 340, 342 does not operatively engage a cam follower member 156, 158. That is, only one cam surface 340, 342 operatively engages a cam follower member 156, 158 at a time.

As the cam follower assembly 150 is coupled, directly coupled, or fixed to the forming assembly moving assembly ram assembly 120, the cam 330 is structured to, and does, pull the ram body 122 radially inwardly as the first cam surface 334 operatively engages a first cam follower member 156. Conversely, the cam 330 is structured to, and does, push the ram body 122 radially outwardly as the second cam surface 336 operatively engages a second cam follower member 158. That is, as used herein, a cam surface/cam profile is a cam surface that "operatively engages" a cam follower, or constructs coupled to a cam follower, when the cam follower moves relative to the cam surface/cam profile and/or when the cam surface/cam profile moves relative to the cam follower.

Figure 12A:
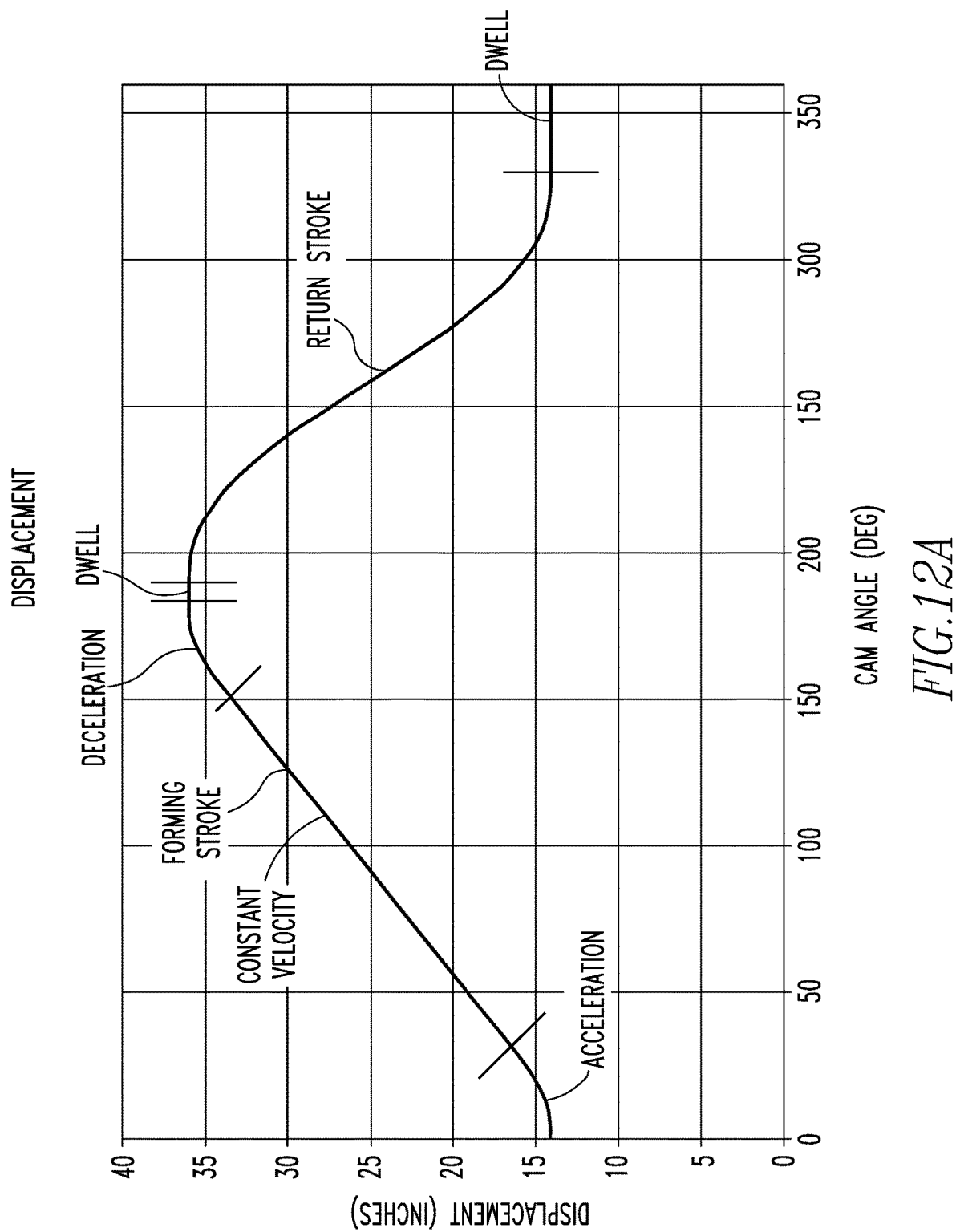
FIG. 12A is a graph showing the displacement of a punch during a stroke associated with the cam of FIG. 12.

As shown in FIG. 12, the cooperative cam surfaces 334, 336, i.e., first cam surface 334 and second cam surface 336, are divided into "portions." That is, the cam surfaces 334, 336 include, or define, a number of drive portions 350, 352 (two shown). As used herein, a "drive" portion of a cam surface means that the cam surface is structured to move another element or assembly. In an exemplary embodiment, the cam surface drive portions 350, 352 include a forward or forming stroke portion 350 and a rearward or return stroke portion 352. That is, as used herein, a "forward stroke" portion 350 is an alternate name for a drive portion that causes a cam follower 150 (as well as constructs coupled to the cam follower 150 such as, but not limited to, the ram body 122) to move toward an associated domer 58. Further, as used herein, a "rearward stroke" portion 352 is an alternate name for a drive portion that causes a cam follower 150 (or constructs coupled to the cam follower 150 such as, but not limited to, the ram body 122) to move away from an associated domer 58.

As described above, the operative engagement of the second cam surface 336 with the second cam follower member 158 causes the moving assembly 44 of the forming assembly 16, including the ram body 122, to move radially outwardly. Thus, a portion of the second cam surface 336 wherein the radius is "increasing" as the cam body 332 moves is a cooperative cam surface forward stroke portion 350. Conversely, the operative engagement of the first cam surface 334 with the first cam follower member 156 causes the moving assembly 44 of the forming assembly 16, including the ram body 122, to move radially inwardly. Thus, a portion of the first cam surface 340 wherein the radius is "decreasing" as the cam body 332 moves is a cooperative cam surface rearward stroke portion 352. As noted above, only one of first cam surface 334 or second cam surface 336 operatively engages a cam follower member 156, 158 at a time. As used herein, however, the opposed cam surfaces 334, 336 are identified by the same portion name. That is, the portion of the first cam surface 334 opposed to the second cam surface forward stroke portion 350 is also identified as the "forward stroke portion 350" even though the first cam surface 334 does not operatively engage the first cam follower member 156 at the forward stroke portion 350. Stated alternately, and further to the definition above, i.e., as used herein, a "forward stroke portion" 350 of associated first cam surface 334 and second cam surface 336, means a portion of the cooperative cam surfaces 334, 336 wherein at least one of the cooperative cam surfaces 334, 336 operatively engages, directly or indirectly, a ram body 122 and causes that ram body 122 to move toward an associated domer 58. Conversely, and further to the definition above, i.e., as used herein, a "rearward stroke portion" 352 of associated cooperative first cam surface 334 and second cam surface 336 means a portion of the cooperative cam surfaces 334, 336 wherein at least one of the cooperative cam surfaces 334, 336 operatively engages, directly or indirectly, a ram body 122 and causes that ram body 122 to move away from an associated domer 58.

Further, it is understood that as the cam body 332 rotates, the cooperative cam surface drive portions 350, 352 operatively engage a cam follower member 156, 158. Thus, each cooperative cam surface drive portion 350, 352 (or alternatively the cam body cooperative cam surface forward stroke portion 350 and the cam body cooperative cam surface rearward stroke portion 352) has a beginning/upstream, first end 350U, 352U and an ending/downstream, second end 350D, 352D. That is, as the cam body 332 rotates, the cooperative cam surface drive portion first end 350U, 352U initially operatively engages a cam follower member 156, 158. As the cam body 332 rotates further, the cooperative cam surface drive portion second end 350D, 352D passes by a cam follower member 156, 158. When this occurs, the cam follower member 156, 158 is no longer disposed at that cooperative cam surface drive portion 350, 352.

The nomenclature of [reference number]U and [reference number]D shall be used herein with each cam surface portion to identify the upstream, first end and downstream, second end of the named portion. For example, as discussed below, the cooperative cam surfaces 334, 336 also include, or define, a first dwell portion 360'. Thus, the upstream/first end of the first dwell portion 360' is identified as "first dwell portion first end 360'U."

It is noted that the pitch (radial change relative to circumferential change) of the cam body ridge 338, and therefore the cooperative first cam surface 334 and second cam surface 336, determines whether the cam follower member 156, 158, and therefore the ram body 122, moves at a generally, or substantially, constant velocity, is accelerating/decelerating (and/or the rate of acceleration/deceleration), or is substantially stationary. That is, as a simplified example (exemplary elements not shown), it is assumed that a ram must move forward (toward a domer) three inches. Further, it is assumed that the cam body cooperative cam surface forward stroke portion extends over an arc of ninety degrees (90°). For this exemplary configuration, the radius of the cooperative cam surfaces and more specifically the second cam surface, increases three inches over the ninety degrees (90°) of the cam body cooperative cam surface forward stroke portion. That is, the movement of the ram body is proportional to the radius of the cooperative cam surfaces. Thus, when the radius of the cooperative cam surfaces increases an inch, the ram moves forward an inch.

Further, as noted and in an exemplary embodiment, the cooperative cam surface drive portion 350 (or alternatively the cam body cooperative cam surface forward stroke portion 350) have a substantially constant velocity cam profile, i.e., a shape structured to impart a substantially constant velocity to the element/assembly that is operatively engaged by the cam surface. In the example above (exemplary elements not shown), wherein the radius of the cooperative cam surfaces and more specifically the second cam surface, increases three inches over the ninety degrees (90°), an increase in the radius of one inch every 30° would produce a substantially constant velocity in the ram.

A cam body ridge 338, and therefore the cooperative first cam surface 334 and second cam surface 336, which operatively engages a cam follower (or constructs coupled to the cam follower such as, but not limited to, the ram body 122) and which has a pitch that is structured to, and does, produce a substantially constant velocity in the cam follower (or constructs coupled thereto) has, as used herein, a "substantially constant velocity cam profile." In an exemplary embodiment, at least one of, or both, the cooperative cam surface forward stroke portion 350 and the cooperative cam surface rearward stroke portion 352 have a substantially constant velocity cam profile. Further, in an exemplary embodiment, the cooperative cam surface forward stroke portion 350 extends over an arc of about one hundred eighty three and one half degrees (183.5°) and the cooperative cam surface rearward stroke portion 352 extends over an arc of about one hundred and forty three degrees (143.0°).

In an exemplary embodiment, the cooperative cam surfaces 334, 336 also include, or define, a number of dwell portions 360', 360" (two shown) and identified herein as the first dwell portion 360' and the second dwell portion 360". As used herein, a "dwell portion" 360', 360" of the associated cooperative first cam surface 334 and second cam surface 336, means a portion of the cooperative cam surfaces 334, 336 wherein neither of the cooperative cam surfaces 334, 336 operatively engages a cam follower (or constructs coupled to the cam follower such as, but not limited to, the ram body 122). Thus, the ram body 122 is generally stationary and does not move toward or away from an associated domer 58. In an exemplary embodiment, and at a cooperative cam surface dwell portion 360', 360", the radius of the cam body ridge 338, and therefore the cooperative first cam surface 334 and second cam surface 336, does not substantially increase or decrease. Thus, the cam body ridge 338, and therefore the cooperative first cam surface 334 and second cam surface 336, do not operatively engage a cam follower member 154 (or constructs coupled to the cam follower member 154 such as, but not limited to, the ram body 122). As used herein, a cam surface that does not operatively engage a cam follower member 154 has a "no velocity cam profile." That is, a "no velocity cam profile" means that cooperative cam surfaces 334, 336 do not cause a cam follower (or constructs coupled to the cam follower such as, but not limited to, the ram body 122) to move toward or away from an associated domer 58. Thus, the cooperative cam surface dwell portions 360', 360" have a "no velocity cam profile." However, to maintain consistent terminology, hereinafter the first dwell portion 360' and the second dwell portion 360" will be said to "engage" or "operatively engage" the moving assembly 44 of a forming assembly 16 (or elements thereof such as, but not limited to, the cam follower members 154). It is understood that while the terms "engage" or "operatively engage" are used, the first dwell portion 360' and the second dwell portion 360" do not actually cause the moving assembly 44 (or elements thereof such as, but not limited to, the cam follower members 154) to move. That is, with respect to the first dwell portion 360' and the second dwell portion 360" only, and as used herein, the terms "engage" and "operatively engage" do not have the meanings set forth above and instead mean that the first dwell portion 360' and the second dwell portion 360" are directly coupled to the cam follower assembly 150.

In an exemplary embodiment, no cooperative cam surface dwell portion 360', 360" extends over an arc greater than thirty degrees (30°). As used herein, the existence of cooperative cam surface dwell portions 360', 360" extending over an arc no greater than thirty degrees does not mean that the cam body ridge 338 has a generally, or substantially, consistent radius relative to the cam body 332 axis of rotation. That is, so long as the cooperative cam surface dwell portions 360', 360" extend over an arc no greater than thirty degrees, the cam body ridge 338 does not have a generally, or substantially, consistent radius relative to the cam body 332 axis of rotation.

In an exemplary embodiment, at least one cam body cooperative cam surface dwell portion 360', 360" is disposed between at least one of the cam body cooperative cam surface forward stroke portion 350 and the cam body cooperative cam surface rearward stroke portion 352, or, the cam body cooperative cam surface rearward stroke portion 352 and the cam body cooperative cam surface forward stroke portion 350. In another exemplary embodiment, each cooperative cam surface dwell portion 360', 360" is disposed between cam body cooperative cam surface drive portions 350, 352. That is, there is a cooperative cam surface first dwell portion 360' disposed between the forward stroke portion second end 350D and the rearward stroke portion first end 352U and, a cooperative cam surface second dwell portion 360" disposed between the rearward stroke portion second end 352D and the forward stroke portion first end 350U. In an exemplary embodiment, the cooperative cam surface first dwell portion 360' extends over an arc of about three and one half degrees (3.5°) and the cooperative cam surface second dwell portion 360" extends over an arc of about thirty degrees (30°).

In an exemplary embodiment, the cooperative cam surfaces 334, 336 also include, or define, a number of portions 370, 372 (two shown), hereinafter identified as the acceleration portion 370 and the deceleration portion 372. The acceleration portion 370 and the deceleration portion 372 each have an "acceleration profile." As used herein, an "acceleration profile" means that the cam body ridge 338, and therefore the cooperative first cam surface 334 and second cam surface 336, operatively engages a cam follower (or constructs coupled to the cam follower such as, but not limited to, the ram body 122) and produce a changing velocity in a ram body 122. That is, an "acceleration profile" means that the cam body ridge 338, and therefore the cooperative first cam surface 334 and second cam surface 336 has/have a pitch that is structured to, and does, produce a changing velocity in a cam follower (or constructs coupled to the cam follower such as, but not limited to, the ram body 122) when the cam surface operatively engages the cam follower. Thus, the surface portions 370, 372 either cause a ram body 122 to increase or decrease its velocity. That is, deceleration of a ram body's 122 velocity is, stated alternately, acceleration in a direction opposite the velocity of the ram body 122.

In an exemplary embodiment such as illustrated in FIG. 12, the cooperative cam surface acceleration portion 370 and deceleration portion 372 are disposed between the cooperative cam surface drive portions 350, 352 and the cooperative cam surface dwell portions 360', 360". That is, starting at the end of dwell portion 360" associated with the ram body 122 being in the first position (i.e., furthest from the domer 58), and moving sequentially about the cam surfaces 334, 336, the portions are in this order: the acceleration portion 370 (which causes an acceleration of the ram body 122 toward the domer 58), a constant speed portion 350, the deceleration portion 372 (which causes a deceleration to no velocity), the first dwell portion 360', the varying speed portion 352 which is of varying speed, and the second dwell portion 360". The acceleration portion 370, the constant speed portion 350, and the deceleration portion 372 make up the forming stroke, whereas the varying speed portion 352 makes up the return stroke. In an exemplary embodiment such as shown in FIG. 12, the acceleration portion 370 extends over an arc of about thirty three degrees (33°) and the deceleration portion 372 extends over an arc of about thirty three and one half degrees (33.5°).

Thus, as shown in FIG. 12, and in an exemplary embodiment, the cooperative first cam surface 334 and second cam surface 336, are divided into the following portions which extend sequentially over the identified arcs.

| | |
|---|---|
| Acceleration portion 370 | 0° to 33° |
| Constant speed portion 350 | 33° to 150° |
| Deceleration portion 372 | 150° to 183.5° |
| First dwell portion 360' | 183.5° to 187° |
| Varying speed portion 352 | 187° to 330° |
| Second dwell portion 360" | 330° to 360° |

Figure 12B:
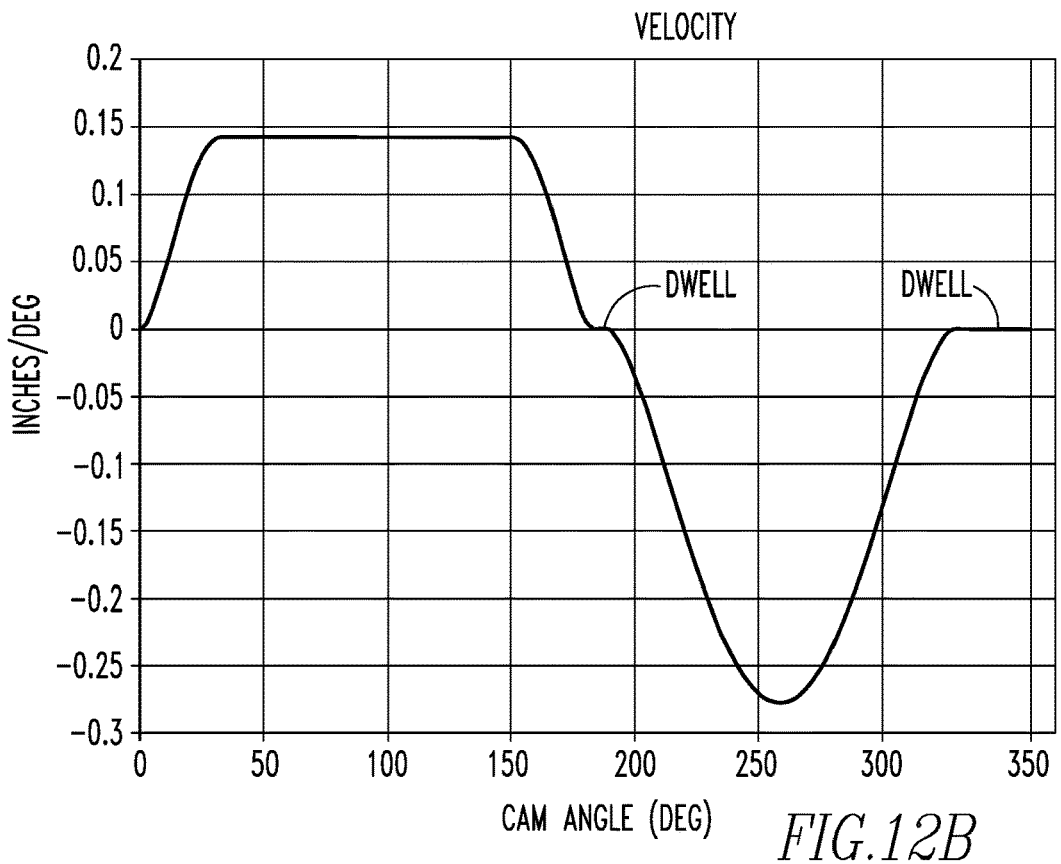
FIG. 12B is a graph showing the velocity of a punch during a stroke associated with the cam of FIG. 12.
Figure 12C:
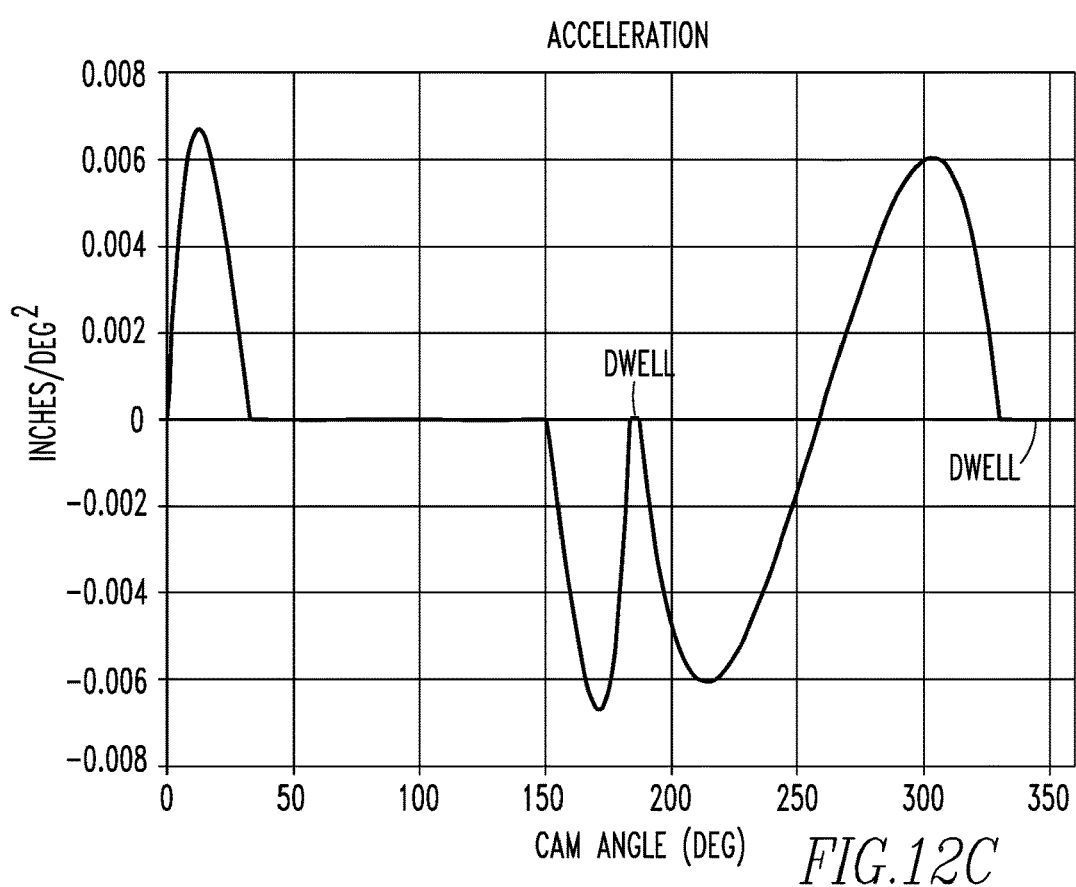
FIG. 12C is a graph showing the acceleration of a punch during a stroke associated with the cam of FIG. 12.

For a cam 330 such as described above, FIG. 12A shows the position or displacement of a punch 124 relative to the first position and relative to the cam 330, as described above, as the cam 330 rotates. FIG. 12B shows the velocity of a ram assembly 120/punch 124 as the cam 330 rotates. FIG. 12C shows the acceleration (or deceleration) of a ram assembly 120/punch 124 as the cam 330 rotates.

When a forming assembly 16 is coupled, directly coupled, or fixed to the mounting assembly 14, the cam body ridge 338 is disposed between the first cam follower member 156 and the second cam follower member 158. That is, as noted above, the wheel 186 of the first cam follower member 156 is disposed adjacent to the first cam surface 334, and, the wheel 186 of the second cam follower member 158 is disposed adjacent to the second cam surface 336. Thus, when the cam 330, i.e., cam body 332, rotates, and when the radius of the cam body ridge 338 is "decreasing" as described above, the first cam surface 334 operatively engages the first cam follower member 156. Conversely, when the cam 330, i.e., cam body 332, rotates, and when the radius of the cam body ridge 338 is "increasing" as described above, the second cam surface 336 operatively engages the second cam follower member 158.

The operative engagement of the first and second cam follower members 156, 158 by the cooperative cam surfaces 334, 336 cause the cam follower assembly 150 and the elements coupled thereto, i.e., the ram assembly 120, to move. That is, the operative engagement of the first and second cam follower members 156, 158 by the cooperative cam surfaces 334, 336 cause the moving assembly 44 of the forming assembly 16 to move.

Thus, the motion of the moving assembly 44 of a forming assembly 16 sequentially occurs as follows. Initially, the moving assembly 44 is in the first position. When the first and second cam follower members 156, 158 are at the second dwell portion 360", the moving assembly 44 (including the ram body 122 and the punch 124) does/do not move. As the moving elements of the moving assembly 44 do not suddenly, or instantly, reverse directions, the moving assembly 44 does not substantially vibrate. This solves the problem(s) noted above. That is, the second cooperative cam surface dwell portion 360" solves the problem(s) noted above. Further, at this time, a cup is moved into position at the mouth of the die pack 56.

As the cam 330, i.e., cam body 332, rotates, the first cooperative cam surface acceleration portion 370 engages the first and second cam follower members 156, 158 which causes the moving assembly 44 (including the ram body 122 and the punch 124) to accelerate and move toward the associated domer 58. As the cam 330, i.e., cam body 332, continues to rotate, the cooperative cam surface forward stroke portion 350 engages the first and second cam follower members 156, 158 which causes the moving assembly 44 (including the ram body 122 and the punch 124) to move toward the associated domer 58 at a substantially constant velocity. This solves the problem(s) noted above. That is, the cooperative cam surface forward stroke portion 350 solves the problem(s) noted above.

As the cam 330, i.e., cam body 332, continues to rotate, the deceleration portion 372 engages the first and second cam follower members 156, 158 which causes the moving assembly 44 (including the ram body 122 and the punch 124) to decelerate, i.e., accelerate in a direction opposite the velocity, to no velocity. As the cam 330, i.e., cam body 332, continues to rotate, the first cooperative cam surface dwell portion 360' engages the first and second cam follower members 156, 158 which causes the moving assembly 44 (including the ram body 122 and the punch 124) to be maintained in the second position. That is, as the moving elements of the moving assembly 44 do not suddenly, or instantly, reverse directions, the moving assembly 44 does not substantially vibrate. The lack of motion/acceleration when the moving assembly 44 is in the second position solves the problem(s) noted above. That is, the first cooperative cam surface dwell portion 360' solves the problem(s) noted above.

Moreover, because the moving assembly 44 dwells in the second position (and in the first position, as discussed below) prior to reversing the direction of the motion, the moving assembly 44 is not subject to "whiplash." This, in turn, means that the elements of the moving assembly 44 are not subject to elongation as described above. Stated alternately, and as used herein, a ram drive assembly 300 that is structured to, and does, avoid "whiplash" in any element operatively engaged thereby is a "steady state" drive assembly. Similarly, a cam 330, or a cam body 332, that is structured to, and does, avoid "whiplash" in any element that is operatively engaged by the cam 330, or a cam body 332, is a "steady state" cam 330, or cam body 332. This solves the problem(s) noted above.

As the cam 330, i.e., cam body 332, continues to rotate, the cooperative cam surface rearward stroke portion 352 engages the first and second cam follower members 156, 158 which causes the moving assembly 44 (including the ram body 122 and the punch 124) to move with a motion generally low in acceleration, pressure angle, and vibrations. This solves the problem(s) noted above. That is, the cooperative cam surface rearward stroke portion 352 solves the problem(s) noted above.

As the cam 330, i.e., cam body 332, continues to rotate, the second cooperative cam surface dwell portion 360" again engages the first and second cam follower members 156, 158 as the cycle begins again. It is understood that each time the cam body 322 rotates 360 degrees, i.e., and as used herein, one "cycle" of the bodymaker 10, a forming assembly 16 makes a can body.

As noted above in conjunction with FIG. 5, one cam follower mounting passage 175 includes an eccentric bushing 187 with the orientation tab 194. The eccentric bushing 187 is structured to, and does, allow the cam follower assembly 150 to move between two configurations. That is, when the eccentric bushing 187 is disposed so that the thinner side 188" is disposed closer to the mounting assembly body passage 20, the distance between the cam follower members 154 is at a maximum. This is the first configuration of the cam follower assembly 150. In this configuration, the distance between the cam follower members 154 is greater than the radial width W of the cam body ridge 338. Thus, as described below, the forming assembly 16 is able to be moved in a direction generally normal to the plane of the cam body 332 without contacting the cam body ridge 338. That is, when the cam body 332 is disposed so that the plane of the cam body 332 is generally horizontal, and when the cam follower assembly 150 is in the first configuration, the forming assembly 16 is able to be lifted, or lowered (e.g., via a suitable overhead lift mechanism), relative to the cam body 332 without the cam follower assembly 150 contacting, or substantially contacting, the cam body ridge 338. It is understood that when the forming assembly moving assembly cam follower assembly 150 is in the first configuration, the cam follower roller bearing eccentric bushing orientation tab 194 is fixed via any suitable arrangement (e.g., a radial recess). Thus, the eccentric bushing 187 is not able to rotate within the mounting passage 175.

Conversely, when the eccentric bushing 187 is disposed so that the thicker side 188" is disposed closer to the mounting assembly body passage 20 (such as shown in FIG. 5), the distance between the cam follower members 154 is at a minimum. This is the second configuration of the forming assembly moving assembly cam follower assembly 150. In this configuration, the distance between the cam follower members 154 is generally, or substantially, the same as the radial width W of the cam body ridge 338. This is the operational configuration of the cam follower assembly 150. In this configuration, any radial change in the position of the cam body ridge 338, i.e., the associated cooperative cam surfaces 334, 336, or, first cam surface 340 and second cam surface 342, causes the cooperative cam surfaces 334, 336 to operatively engage the cam follower assembly 150.

In this configuration, the bodymaker 10 solves the problem(s) stated above. That is, for example, the ram drive assembly 300 is a "direct" ram drive assembly 300, as that term is defined above. That is, the ram drive assembly 300 is structured to, and does, convert a rotational motion (from the motor output shaft 312) to a reciprocal motion (of the ram body 122) without a pivoting construct such as, but not limited to, a swing arm. This solves the problem(s) noted above.

It is further noted that a bodymaker 10 as described above with a disk cam 330 has a configuration unlike known bodymakers. As noted above, each ram body 122 has a longitudinal axis L. Further, the cam body 332 axis of rotation is a "prime axis of rotation" for the bodymaker ram drive assembly 300, as that term is defined above. Thus, the cam body 332 axis of rotation is also identified herein as the "ram drive assembly prime axis of rotation 333." As described above, each ram body longitudinal axis L extends generally radially relative to the ram drive assembly prime axis of rotation 333 (e.g., see FIG. 2). That is, the ram body longitudinal axes L are generally disposed in a plane and are radially offset about the ram drive assembly prime axis of rotation 333. In an exemplary embodiment, the forming assemblies 16 are generally evenly disposed about the ram drive assembly prime axis of rotation 333. That is, for "N" number of forming assemblies 16, the forming assemblies 16 are disposed about 360°/N degrees apart. In an exemplary embodiment, there are two or more forming assemblies 16 disposed about the ram drive assembly prime axis of rotation 333. That is, in an exemplary embodiment, the number of forming assemblies 16 includes between two and ten forming assemblies 16. Further, in an exemplary embodiment, the number of forming assemblies 16 includes one of two forming assemblies 16, four forming assemblies 16, six forming assemblies 16, eight forming assemblies 16 or ten forming assemblies 16.

Further, in an exemplary embodiment, when there is an even number of forming assemblies 16, each forming assembly 16 may be disposed generally in opposition to another forming assembly 16 across the ram drive assembly prime axis of rotation 333 (i.e., positioned generally 180° about the prime axis 333). However, it is to be appreciated that the drive arrangements as described herein allow for the forming assemblies 16 to be positioned in other configurations that are not in opposition to each other across the ram drive assembly prime axis of rotation 333 (i.e., positioned other than 180° with respect to each other). For example, in one exemplary embodiment, a bodymaker 10 includes only two forming assemblies 16 positioned only 45° apart about the prime axis 333. In another example, a bodymaker 10 includes only two forming assemblies 16 positioned only 36° apart about the prime axis 333. Further, it is to be appreciated that the angular spacing between adjacent forming assemblies 16 of a bodymaker 10 may differ among pairs of forming assemblies 16 within the bodymaker 10. As an example, without limitation, a bodymaker 10 having three forming assemblies 16 may have two of the forming assemblies 16 positioned 90° apart about the prime axis 333, with the third forming assembly spaced 135° about the prime axis 333 relative to each of the other two forming assemblies 16. In any of these configurations, the ram drive assembly 300 is a "single source/[X]-output ram drive assembly," as that term is defined above. That is, for example, if the forming system 12 includes three forming assemblies 16, the ram drive assembly 300 is a single source/3-output ram drive assembly. Thus, for a forming system 12 including one of four, five, six, seven, eight, nine or ten forming assemblies 16, the ram drive assembly 300 is a single source/4-output ram drive assembly, a single source/5-output ram drive assembly, a single source/6-output ram drive assembly, a single source/7-output ram drive assembly, a single source/8-output ram drive assembly, a single source/9-output ram drive assembly, a single source/10-output ram drive assembly, respectively. An embodiment with eight forming assemblies 16 is shown in FIG. 13.

In an exemplary embodiment, the forming system 12 includes four forming assemblies 16. As shown in FIG. 2, the four forming assemblies 16 are disposed about, or substantially, ninety degrees apart about the prime axis 333 of the ram drive assembly 300. Further, in this configuration, the forming assemblies 16 are "asymmetrical forming assemblies." That is, in this configuration, the forming elements do not move substantially in opposition to each other.

In an embodiment such as shown in FIG. 11 wherein the bodymaker is a barrel cam 330B, the axis of rotation of the cam body 332B defines a prime axis of rotation 333B. In this embodiment, however, the longitudinal axis L of each ram body 122 extends generally parallel to the prime axis of rotation 333B of the barrel cam 330B.

Another aspect of the motion of the ram assembly 120, i.e., the ram body 122, caused by operative engagement by a cam 330 of a ram drive assembly 300 as described above is that no two ram bodies are in the same "medial position" at one time. That is, for example, no two ram bodies 122 are disposed with the punch 124 entering the die pack 56 associated therewith at the same time. It is noted, however, that two ram bodies 122 are, in certain configurations, disposed with the punch 124 in die pack 56 associated therewith at the same time. That is, for example, the forming system 12 with the cam 330 in a specific orientation may have one ram body 122 with the punch 124 at the upstream end of the die pack 56 associated therewith while another ram body 122 has the punch 124 disposed at the downstream end of the die pack 56 associated therewith. When the forming assemblies 16 are "asymmetrical forming assemblies," the power needed, i.e., the size/power of the motor 310 is reduced because no ram assemblies 120 are disposed at the same time in a location that generates the maximum resistance. This solves the problem(s) noted above. Further, the bodymaker 10, i.e., the ram drive assembly 300, as described above is structured to, and selectively does, operate with less than the full set of forming assemblies. That is, the bodymaker 10 as described above has a number of forming assemblies 16. Whatever the maximum number of forming assemblies 16 associated with a specific bodymaker 10 is, as used herein, a "full set" of forming assemblies 16. For example, in an embodiment wherein the maximum number of forming assemblies 16 is four, the "full set" of forming assemblies 16 means four forming assemblies 16.

Unlike prior art bodymakers which needed to balance the loads created by the forming assemblies 16, the present bodymaker 10 is structured to, and, when required, does, operate with less than a "full set" of forming assemblies 16. For example, in an embodiment wherein the "full set" of forming assemblies 16 means four forming assemblies 16, the bodymaker 10, i.e., the ram drive assembly 300, is structured to, and does, operate with three, two, or one forming assemblies 16. This solves the problem(s) noted above.

Stated alternately, the bodymaker 10 is structured to, and when required does, operate with fewer than all forming assemblies operatively coupled to the drive assembly. That is, unlike a prior art bodymaker having two forming assemblies coupled to a crank, the use of a cam 330 eliminates the need for the drive assembly to be balanced. Thus, for example, if one of four forming assemblies 16 needs repaired, the defective forming assembly 16 is disengaged from the drive assembly 300 and then the remaining three forming assemblies 16 are put back into operation. As used herein, a bodymaker drive assembly 300 that is structured to operate with less than all forming assemblies 16 engaged thereby is a "limited load" drive assembly 300. Use of a limited load drive assembly 300 solves the problem(s) noted above.

In an exemplary embodiment, such as shown in FIGS. 3, 4 and 6, the mounting assembly 14 further includes a number of forming assembly positioning assemblies 400. There is one positioning assembly 400 associated with each forming assembly 16. When the mounting assembly body 18 is disposed in a generally horizontal plane, each positioning assembly 400 is substantially disposed below the mounting assembly body 18. Each forming assembly positioning assembly 400 is structured to, and does, move (and in this configuration lift/lower) a forming assembly 16. That is, each forming assembly positioning assembly 400 is structured to, and does, move a forming assembly 16 among a first (non-operational) position, such as shown in FIG. 6, wherein the forming assembly 16 is spaced from an associated mounting assembly planar body upper surface recess 34 (i.e., is above an associated mounting assembly planar body upper surface recess 34), and a second (operational) position such as shown in FIG. 4, wherein the forming assembly 16 is disposed within an associated mounting assembly planar body upper surface recess 34.

In the illustrated exemplary embodiment, each positioning assembly 400 includes a fluid pressure source 402 and a number of actuators 404 coupled thereto via fluid conduits 406. The fluid pressure source 402 may be any suitable source of pneumatic or hydraulic pressure (e.g., without limitation an air compressor, an hydraulic pump, a supply line from a remote pressure source, etc.). Each actuator may be a suitable pneumatic or hydraulic actuator coupled to the corresponding suitable pressure source via flexible or rigid conduits 406. Control of movement of each actuator 404 may be provided via any suitable control arrangement (not numbered). Alternatively, each positioning assembly may utilize electric actuators powered by a suitable source of electrical power and controlled by a suitable controller. Additionally, each positioning assembly 400 may include one or more suitable locking mechanisms (not numbered, e.g., mechanical and/or electromagnetic arrangements) for securing each forming assembly 16 to mounting assembly 14.

It is to be understood that, when a forming assembly 16 is being moved between the first and second positions, and when the forming assembly 16 is in the first (non-operational) position, the cam follower assembly 150 is in the first (widely spaced) configuration previously discussed. Further, when the forming assembly 16 is in the second (operational) position, the cam follower assembly 150 is in the second (closely spaced) configuration previously discussed.

When the mounting assembly planar body upper surface recesses 34 are "machined" recesses 34, each forming assembly 16 is automatically positioned as the forming assembly 16 is moved into the machined mounting assembly planar body upper surface recess 34. Alternatively, after a forming assembly 16 is disposed in a mounting assembly planar body upper surface recess 34, a user brings the forming assembly 16 into the proper alignment by passing guide pins 39 through the associated guide pin passages 36, 68. Further, a guide pin 39 is temporarily disposed in the alignment pin passage 178 of the slider 152 of the cam follower assembly 150 and the alignment passage 344 of the cam 330. Use of the guide pins 39 brings each forming assembly 16 into proper alignment with the cam 330. It is again noted that each forming assembly 16 is, in an exemplary embodiment, an aligned, unitary forming assembly 16; thus, the elements with each forming assembly 16 do not require further alignment. This solves the problem(s) noted above.

In one embodiment, the bodymaker 10 includes a single forming assembly 16. In another embodiment, the bodymaker 10 includes a plurality of forming assemblies 16. In another embodiment, the bodymaker 10 includes an even number of forming assemblies 16. Thus, in an exemplary embodiment, the number of forming assemblies includes one of a single forming assembly 16, two forming assemblies 16, four forming assemblies 16, six forming assemblies 16, eight forming assemblies 16 or ten forming assemblies 16. Further, and as described above, with forming assemblies 16 disposed about the cam body 332 axis of rotation, the longitudinal axes of the forming assemblies 16 extend generally, or substantially, radially relative to the cam 320 axis of rotation.

Further, in a configuration disclosed above wherein the bodymaker 10 includes more than two forming assemblies 16, the bodymaker 10 produces more than two can bodies per cycle. This solves the problem(s) noted above. That is, for example, in an embodiment with four forming assemblies 16, the bodymaker 10 produces four can bodies per cycle. Moreover, with a cam 330 rotating at 320 r.p.m., the bodymaker 10 with four forming assemblies 16, or alternately, the forming system 12 with four forming assemblies 16, produces one of a large number of can bodies per minute, a very large number of can bodies per minute, or an exceedingly large number of can bodies per minute. As used herein, a "large" number of can bodies per minute means more than 1,280 can bodies per minute. As used herein, a "very large" number of can bodies per minute means more than 1,440 can bodies per minute. As used herein, an "exceedingly large" number of can bodies per minute means more than 1,600 can bodies per minute. A bodymaker 10 that produces any of a large number of can bodies per minute, a very large number of can bodies per minute, or an exceedingly large number of can bodies per minute solves the problem(s) noted above.

Figure 14:
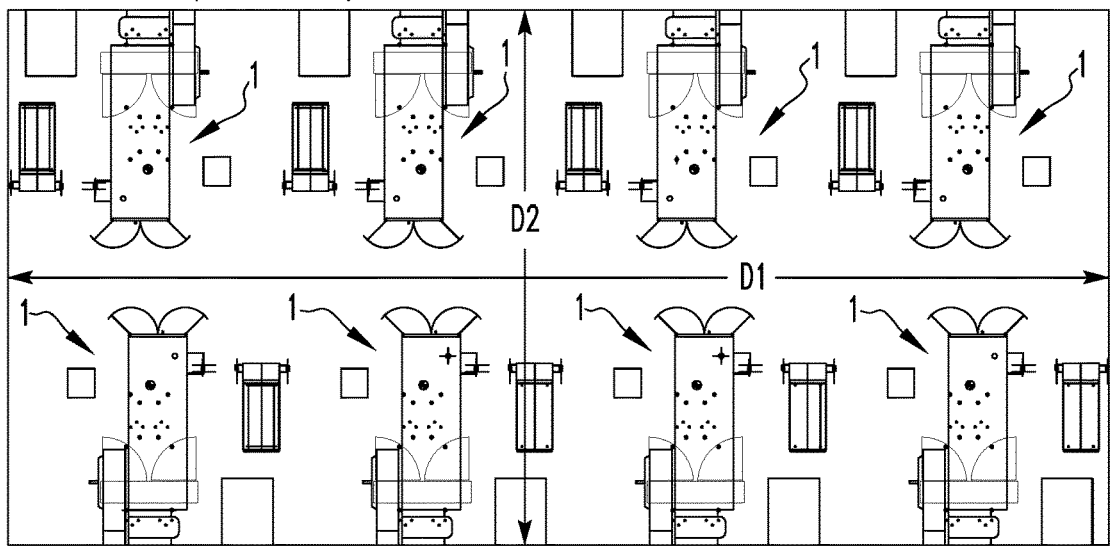
FIG. 14 is a schematic top view of eight prior art bodymakers and related machinery arranged in a known manner and required spacing.

Further, the can bodymaker 10 as described above occupies a "reduced" floor space as compared to conventional bodymakers. As used herein, the term "floor space" includes the space bound by the perimeter of the elements extending from the bodymaker. For example, FIG. 13 shows an overhead view of a layout of a bodymaker 10' in accordance with an exemplary embodiment of the disclosed concept having eight forming assemblies 16 and related machinery (e.g., trimmers). Such layout occupies/requires a floor space having dimensions of about D1'×D2'. In such example both D1' and D2' are 366 inches. Hence, the overall floor space occupied/required by such layout is 133,956 in$^2$ or about 930 ft$^2$. In comparison, FIG. 14 shows a layout of eight prior art bodymakers 1 (i.e., the number of prior art bodymakers 1 needed to achieve the same or similar output as bodymaker 10' of FIG. 13) and related machinery. Such layout occupies/requires a floor space having dimensions of about D1×D2. In such example D1 is 885.5 inches and D2 is 432 inches. Hence, the overall floor space occupied/required by such layout is 382,536 in$^2$ or about 2,656 ft$^2$, almost three times the floor space as the bodymaker 10' in accordance with the disclosed concept. As a bodymaker in accordance with the disclosed concept provides for similar output while requiring a lesser or "reduced" floor space such bodymaker occupies a "reduced" floor space as compared to conventional bodymakers.

In addition to saving floor space, it is to be appreciated that bodymakers in accordance with the disclosed concept require less energy to produce an equivalent amount of can bodies as compared to conventional arrangements. As an example, a conventional single head bodymaker requires a 75 HP motor. A recently released two head unit also requires 75 HP, and a four head unit requires 300 HP. In stark contrast, a four head (i.e., four forming assembly 16) bodymaker in accordance with the disclosed concept requires only a single 30 HP hp motor. Hence for the same can body output, a bodymaker in accordance with the disclosed concept provides significant energy savings. Further, conventional bodymakers require flywheels of considerable mass to supply the energy needed to form a can due to their forming/drive arrangement(s). In contrast, bodymakers in accordance with the disclosed concept do not require such flywheels because of the low mass of the forming assembly as well as the profile available due to the use of the disk cam (i.e., zero acceleration portions at the end of the strokes and, consequently, zero inertia forces and deformations).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A cam follower assembly for a can bodymaker, the cam follower assembly comprising:
    a slider structured to be coupled to a proximal end of a ram body of the can bodymaker;
    a plurality of cam follower members rotatably coupled to the slider, wherein the cam follower members are structured to be operatively coupled to a cam of a ram drive assembly; and
    a cam follower bearing assembly having a number of hydrostatic/hydrodynamic bearing pads positioned and structured to engage with corresponding, cooperatively positioned, bearing members,
    wherein the slider comprises a slider body and an upper frame portion extending upward from the slider body, and wherein the number of hydrostatic/hydrodynamic bearing pads are provided on the upper frame portion.

2. The cam follower assembly of claim 1, wherein each bearing pad includes a recessed bearing pocket that is structured to house a pressurized supply of bearing fluid provided therein.

3. The cam follower assembly of claim 1, wherein the upper frame portion of the slider body comprises:
    a first member extending upward from the slider body;
    a second member extending upward from the slider body; and
    a third member extending between the first and second members and spaced a distance above the slider body.

4. The cam follower assembly of claim 3, wherein the number of hydrostatic/hydrodynamic bearing pads includes:
    a first bearing pad coupled to an outward facing face of the first member;
    a second bearing pad coupled to an outward facing face of the second member; and
    a third bearing pad coupled to an upward facing face of the third member.

5. The cam follower assembly of claim 1, wherein the slider further comprises a lower frame portion extending downward from the slider body.

6. The cam follower assembly of claim 5, wherein the lower frame portion comprises:
    a first member extending downward from the slider body;
    a second member extending downward from the slider body; and
    a third member extending between the first and second members and spaced a distance below the slider body.

7. A cam follower assembly for a can bodymaker, the cam follower assembly comprising:
    a slider structured to be coupled to a proximal end of a ram body of the can bodymaker; and
    a plurality of cam follower members rotatably coupled to the slider, wherein the cam follower members are structured to be operatively coupled to a cam of a ram drive assembly,
    wherein each of the cam followers comprises a roller bearing, and
    wherein one of the roller bearings includes an eccentric bushing positionable between a first positioning, wherein the one roller bearing is disposed a first distance from another one of the plurality of roller bearings, and a second positioning, wherein the one roller bearing is disposed a second distance, different than the first distance, from the other one of the plurality of roller bearings.

8. A moving assembly for a can bodymaker, the moving assembly comprising:
    a ram assembly including an elongated ram body having a proximal end and an opposite distal end; and
    a cam follower assembly comprising:
        a slider coupled to the proximal end of the ram body;
        a plurality of cam follower members rotatably coupled to the slider, wherein the cam follower members are structured to be operatively engaged by a cam of a ram drive assembly; and
        a cam follower bearing assembly having a number of hydrostatic/hydrodynamic bearing pads positioned and structured to engage with corresponding, cooperatively positioned, bearing members,
    wherein the slider comprises a slider body and an upper frame portion extending upward from the slider body, and wherein the number of hydrostatic/hydrodynamic bearing pads are provided on the upper frame portion.

9. The moving assembly of claim 8, wherein each bearing pad includes a recessed bearing pocket that is structured to house a pressurized supply of bearing fluid provided therein.

10. The moving assembly of claim 8, wherein the upper frame portion of the slider body comprises:
    a first member extending upward from the slider body;
    a second member extending upward from the slider body; and
    a third member extending between the first and second members and spaced a distance above the slider body.

11. The moving assembly of claim 10, wherein the number of hydrostatic/hydrodynamic bearing pads includes:
    a first bearing pad coupled to an outward facing face of the first member;
    a second bearing pad coupled to an outward facing face of the second member; and
    a third bearing pad coupled to an upward facing face of the third member.

12. The moving assembly of claim 8, wherein the slider further comprises a lower frame portion extending downward from the slider body, the lower frame portion comprising:
    a first member extending downward from the slider body;
    a second member extending downward from the slider body; and
    a third member extending between the first and second members and spaced a distance below the slider body.

13. A moving assembly for a can bodymaker, the moving assembly comprising:
    a ram assembly including an elongated ram body having a proximal end and an opposite distal end; and
    a cam follower assembly comprising:
        a slider coupled to the proximal end of the ram body; and a plurality of cam follower members rotatably coupled to the slider, wherein the cam follower members are structured to be operatively engaged by a cam of a ram drive assembly, wherein each of the cam followers comprises a roller bearing, and wherein one of the roller bearings includes an eccentric bushing positionable between a first positioning, wherein the one roller bearing is disposed a first distance from another one of the plurality of roller bearings, and a second positioning, wherein the one roller bearing is disposed a second distance, different than the first distance, from the other one of the plurality of roller bearings.

* * * * *